United States Patent [19]

Maeshima

[11] Patent Number: 4,701,805
[45] Date of Patent: Oct. 20, 1987

[54] IMAGE PROCESSING SYSTEM WITH REAL TIME IMAGE PROCESS

[75] Inventor: Katsuyoshi Maeshima, Tokyo, Japan

[73] Assignee: Canon Kabushiki Kaisha, Tokyo, Japan

[21] Appl. No.: 615,098

[22] Filed: May 29, 1984

[30] Foreign Application Priority Data

Jun. 1, 1983 [JP] Japan .................................. 58-97170

[51] Int. Cl.[4] ........................ H04N 1/40; H04N 1/10
[52] U.S. Cl. .................................. 358/282; 358/280; 358/293; 358/287
[58] Field of Search ............... 358/285, 293, 294, 280, 358/256, 282, 287

[56] References Cited

U.S. PATENT DOCUMENTS

| | | | |
|---|---|---|---|
| 4,227,218 | 10/1980 | Vandling | 358/282 |
| 4,249,217 | 2/1981 | Korte et al. | 358/294 |
| 4,251,837 | 2/1981 | Janway, III | 358/282 |
| 4,358,794 | 11/1982 | Kurokami et al. | 358/293 |
| 4,439,790 | 3/1984 | Yoshida | 358/256 |
| 4,449,151 | 5/1984 | Yokota et al. | 358/294 |
| 4,459,619 | 7/1984 | Yoshida | 358/294 |
| 4,465,939 | 8/1984 | Tamura | 358/294 |
| 4,468,703 | 8/1984 | Fujiwara et al. | 358/282 |
| 4,495,522 | 1/1985 | Matsunawa et al. | 358/280 |
| 4,517,606 | 5/1985 | Yokomizo et al. | 358/280 |

FOREIGN PATENT DOCUMENTS

| | | |
|---|---|---|
| 0008739 | 3/1980 | European Pat. Off. . |
| 0100811 | 2/1984 | European Pat. Off. . |
| 0106291 | 4/1984 | European Pat. Off. . |
| 2114847 | 8/1983 | United Kingdom . |
| 2115256 | 9/1983 | United Kingdom . |

*Primary Examiner*—Howard W. Britton
*Assistant Examiner*—John K. Peng
*Attorney, Agent, or Firm*—Fitzpatrick, Cella, Harper & Scinto

[57] ABSTRACT

There is disclosed an image processing system for processing image data obtained from two image sensors such as CCD's, in which the threshold value for binary encoding is varied in the case of reading a sample marker for splicing the image data from two CCD's, thus enabling secure reading of the sample marker and ensuring smooth connection of the image data.

23 Claims, 62 Drawing Figures

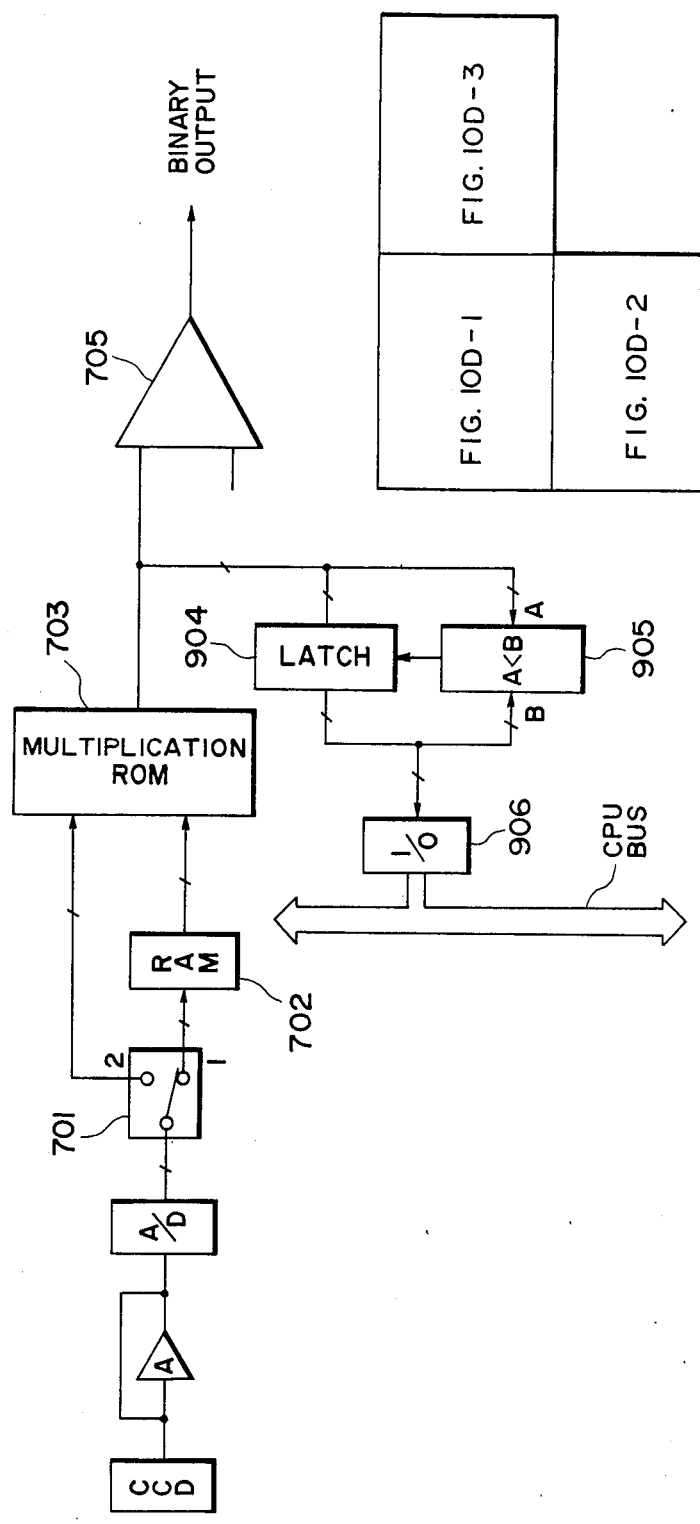

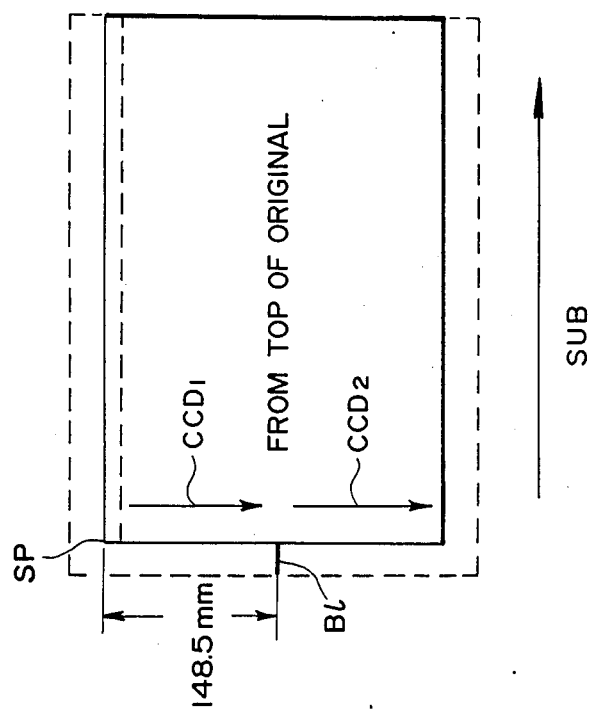

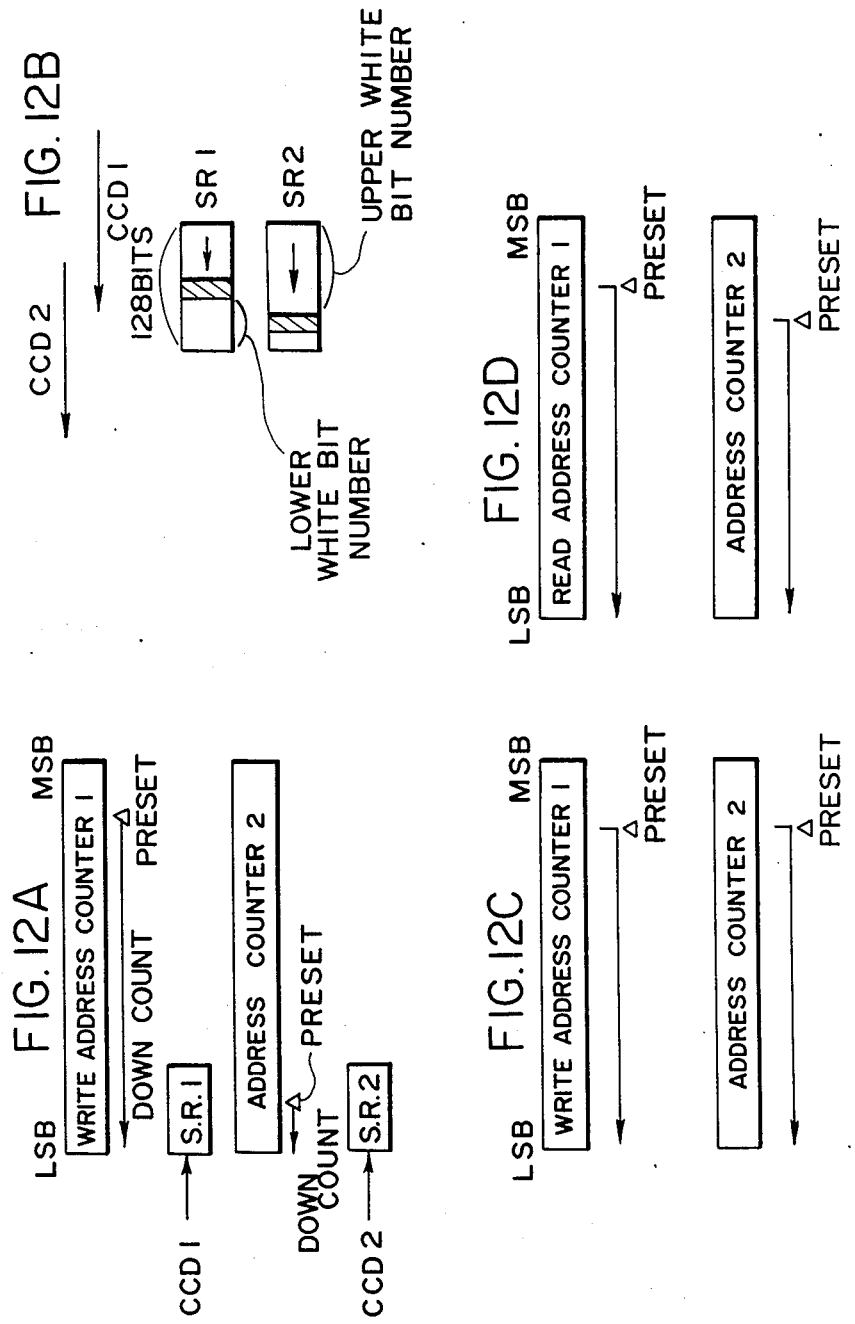

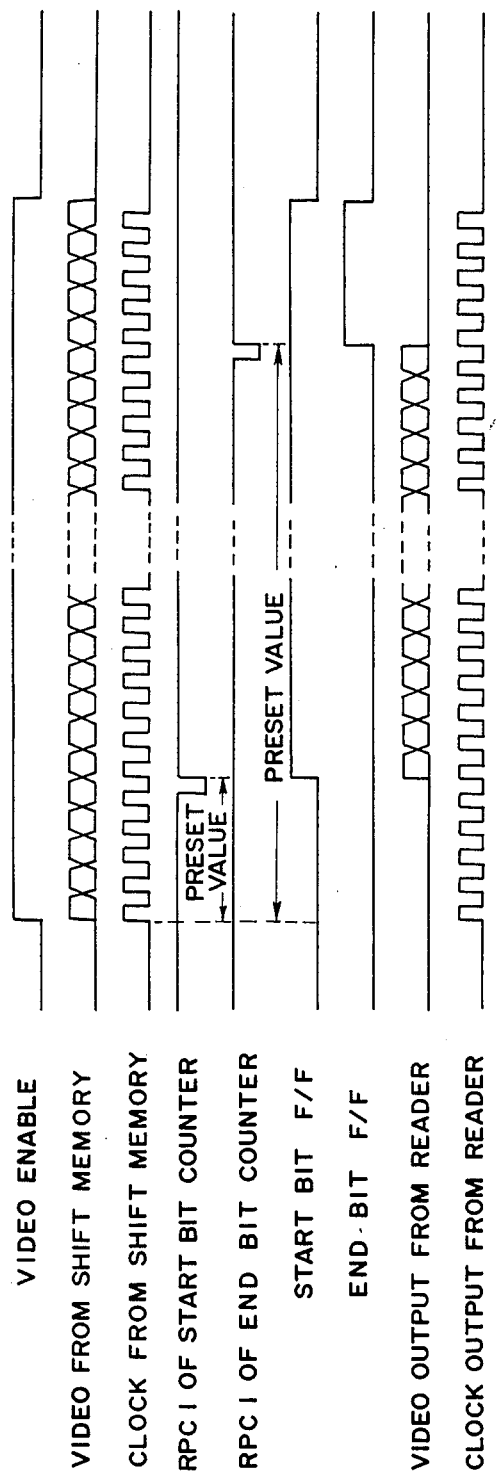
F I G. 15G

| | START BIT COUNTER | END BIT COUNTER |
|---|---|---|
| INITIALIZATION | PRESET 4751 BITS | PRESET 4751 BITS |
| AFTER COUNTING OF $N_0$ LINE | PRESET $H_0$ BITS | PRESET $H_1$ BITS |
| AFTER COUNTING OF $N_1$ LINE | PRESET $H_2$ BITS | PRESET $H_3$ BITS |
| AFTER COUNTING OF $N_2$ LINE | PRESET $H_4$ BITS | PRESET $H_5$ BITS |
| AFTER COUNTING OF $N_3$ LINE | PRESET 4751 BITS | PRESET 4751 BITS |

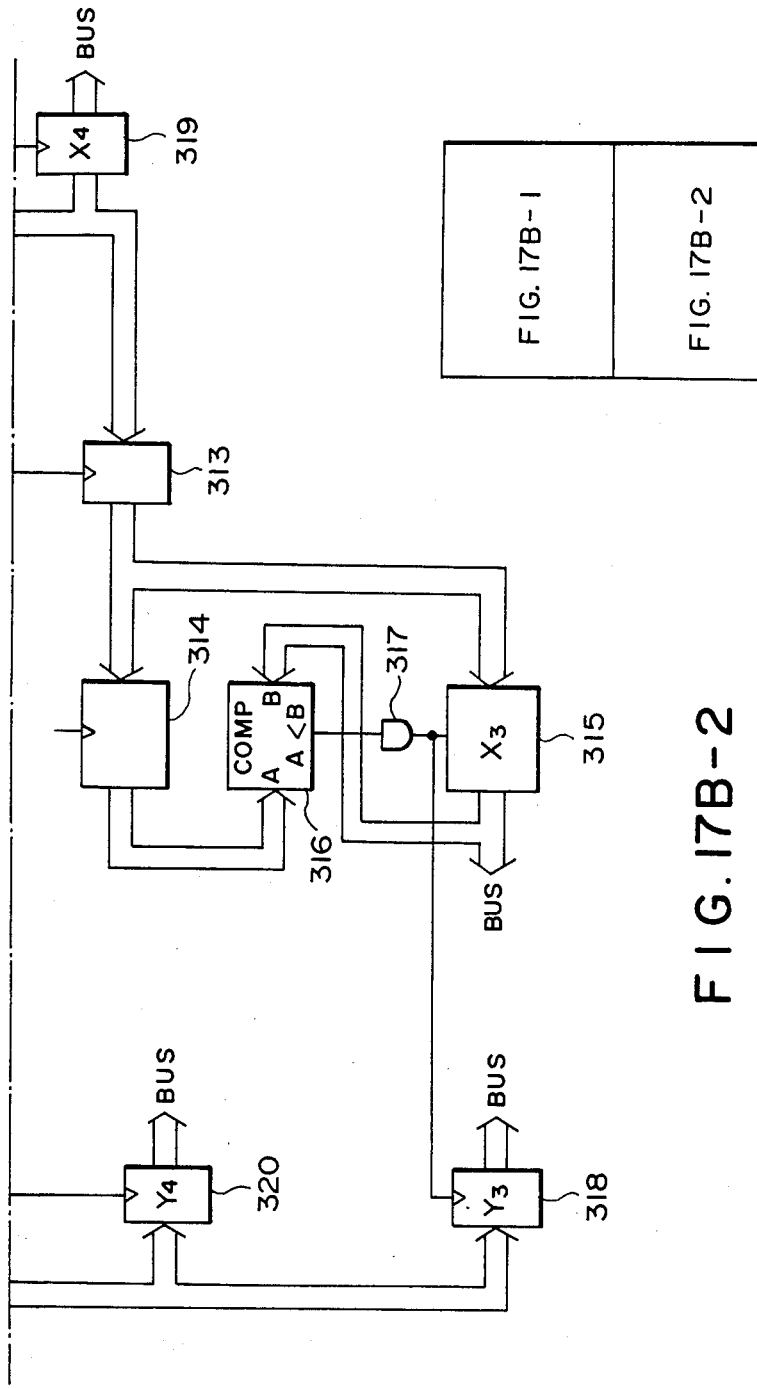

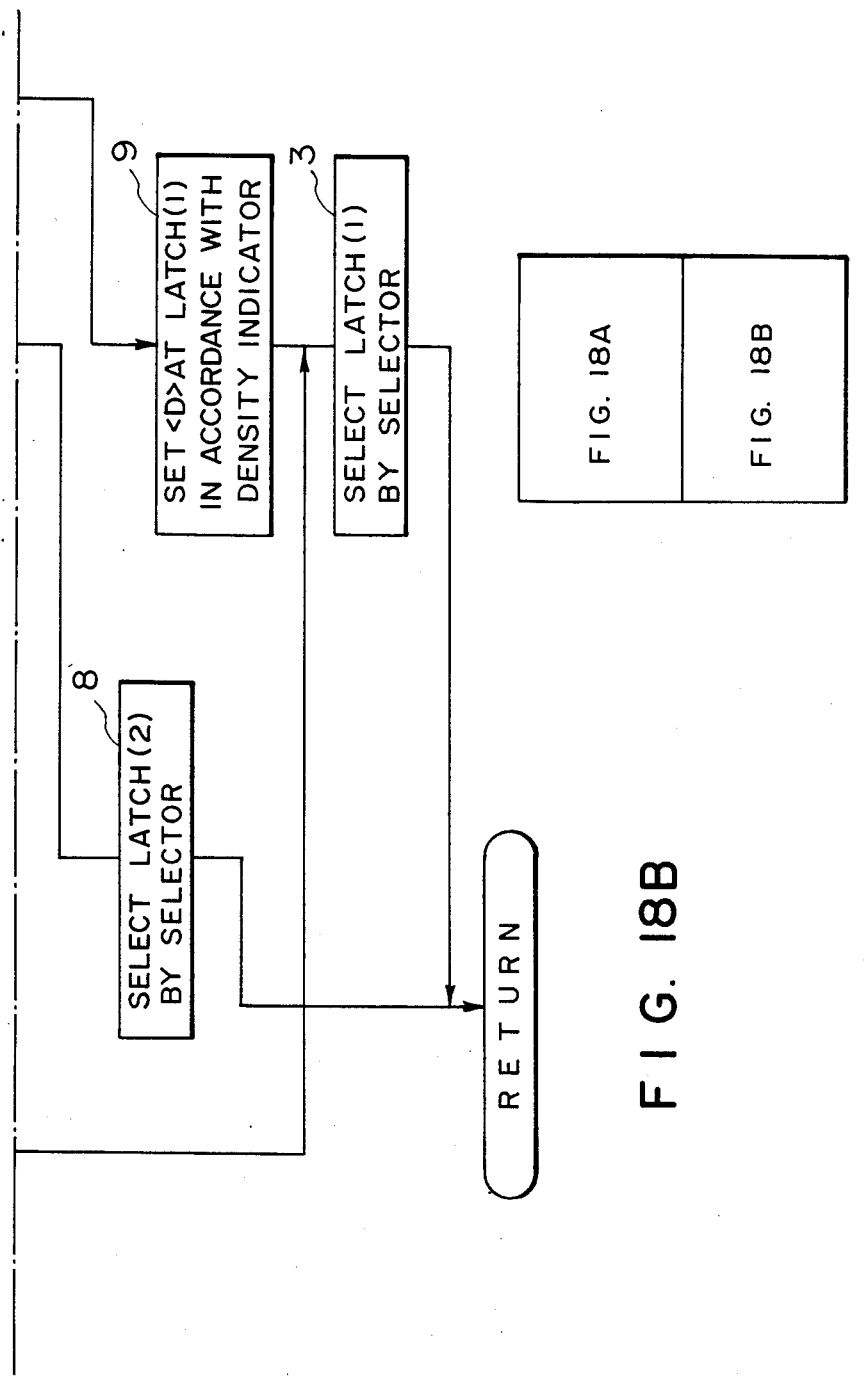

IMAGE PROCESSING SYSTEM WITH REAL TIME IMAGE PROCESS

BACKGROUND OF THE INVENTION

1. Field of the Invention

The present invention relates to an image processing system.

2. Description of the Prior Art

There is already known a system for reading data from an original document and converting said data into binary output data.

The present applicant has already proposed an image processing system for reading an original image with plural CCD's, in which, in order to avoid positional aberration or overlapping of the image data at the junctions of said CCD's, a black sample marker is read in advance and the resulting binary data indicating the position of the marker are utilized for correcting the image data of the original document.

The present applicant has also proposed an image processing system capable of a process for recognizing the position and dimension of the original image by the CCD's for reading the original document. In this system the recognition of the position and dimension of the original image is conducted after the image data obtained by image reading are binary encoded.

In these systems, however, there may result drawbacks, explained in the following, if a threshold value for binary encoding for image reproduction of the image data obtained by reading the original document is utilized also for binary encoding of the data obtained by reading the sample marker for the correction of the junctions of CCD's.

More specifically the precision of such junction correction may be caused to deteriorate, at the sample marker reading, by a stain or a smear on a white board bearing the black marker. Particularly in the case that the threshold value for binary encoding is selected low in order to enable binary encoding of an original image of low density, such a stain may be erroneously identified as the marker. On the other hand, if said threshold value is selected high in order not to reproduce the background of the original image, the marker may not be recognized properly.

Also, if the threshold value for binary encoding, for the purpose of image reproduction, the data obtained by reading the original image is utilized for conducting the process for recognizing the position and dimension of the original image, there will result a limitation on the recognizable original images. More specifically, if the threshold value is selected at the approximate middle between black and white levels, it becomes impossible to distinguish a document with a colored background such as blue from other areas.

Also, for the purpose of reproducing a half-tone image, the image data obtained by reading the original image may be subjected to a dither process in which the image data are periodically compared with binary encoding threshold levels. In such a case the precision of the aforementioned junction correction or of the document recognition may be caused to deteriorate depending on the dither pattern or the threshold levels of the dither elements.

SUMMARY OF THE INVENTION

An object of the present invention is to provide an image processing system capable of avoiding the above-mentioned drawbacks.

Another object of the present invention is to provide an image processing system capable of generating signals faithfully for image reproduction.

Still another object of the present invention is to provide an image processing system capable of precisely recognizing the status a property of the original image.

Still another object of the present invention is to provide an image processing system not affecting the continuity of the image data even when the tone of the image reproduction is altered.

Still another object of the present invention is to provide an image processing system capable of correctly recognizing the status and property of the original image even when the tone of the image reproduction is altered.

Still another object of the present invention is to provide an image processing system capable of generating binary encoded image data of high quality.

Still another object of the present invention is to provide an image processing system capable of image editing of high quality.

Still another object of the present invention is to provide an improved digital image reader.

Still another object of the present invention is to provide an improved real time digital copying machine.

The foregoing and still other objects of the present invention will become fully apparent from the following description.

BRIEF DESCRIPTION OF THE DRAWINGS

FIGS. 6A-1 and 6A-2, is a block diagram of a circuit for use in the image processing apparatus shown in FIG. 1;

FIGS. 6B-1 and 6B-2, is a flow chart thereof;

FIGS. 10A, 10B, 10C, 10D (comprising FIGS. 10D-1, 10D-2 and 10D-3) and 13 (comprising FIGS. 13A, 13B, 13C and 13D) are circuit diagrams of the circuits shown in FIG. 6;

FIGS. 11 and 12 are schematic views explaining junction correction for the CCD's;

FIG. 15G is a timing chart of the circuit shown in FIG. 13;

FIG. 16, comprising

FIGS. 17B-1 and 17B-2, is a circuit diagram of a coordinate recognizing circuit;

FIG. 18, comprising FIGS. 18A and 18B is a flow chart for setting the binary encoding data.

DETAILED DESCRIPTION OF THE PREFERRED EMBODIMENTS

Figure 1:
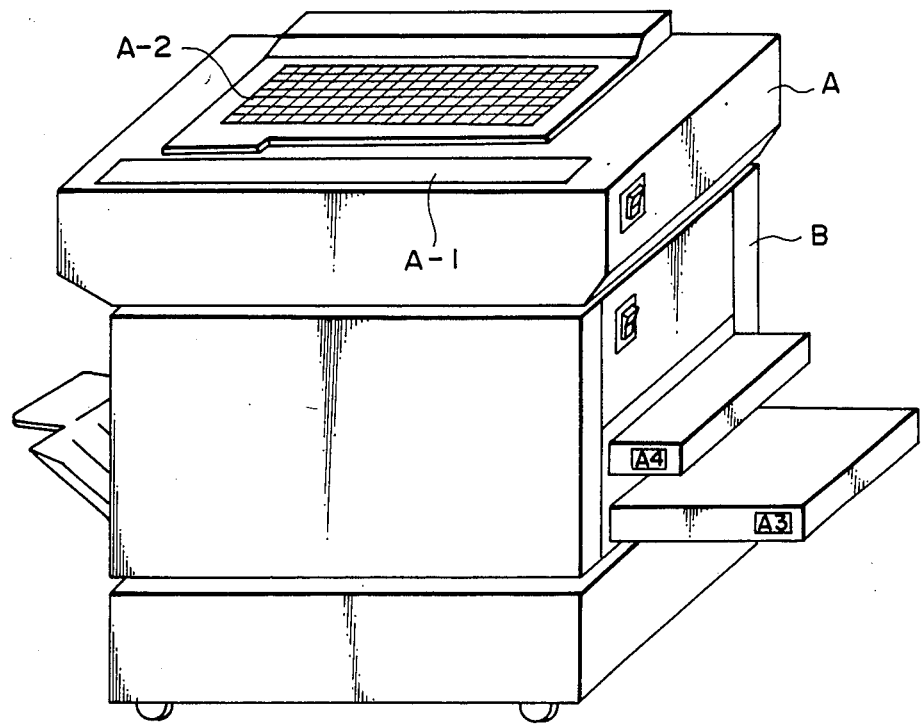
FIG. 1 is a perspective view of an image processing apparatus in which the present invention is applicable.

FIG. 1 shows an external view of a copying apparatus embodying the present invention, basically consisting of two units, namely a reader A and a printer B, which are functionally and mechanically separate each other and can be used independently. These units are mutually connected through an electric cable. The reader B is equipped with an operation unit A-1 (FIG. 4) explained later.

Figure 3:
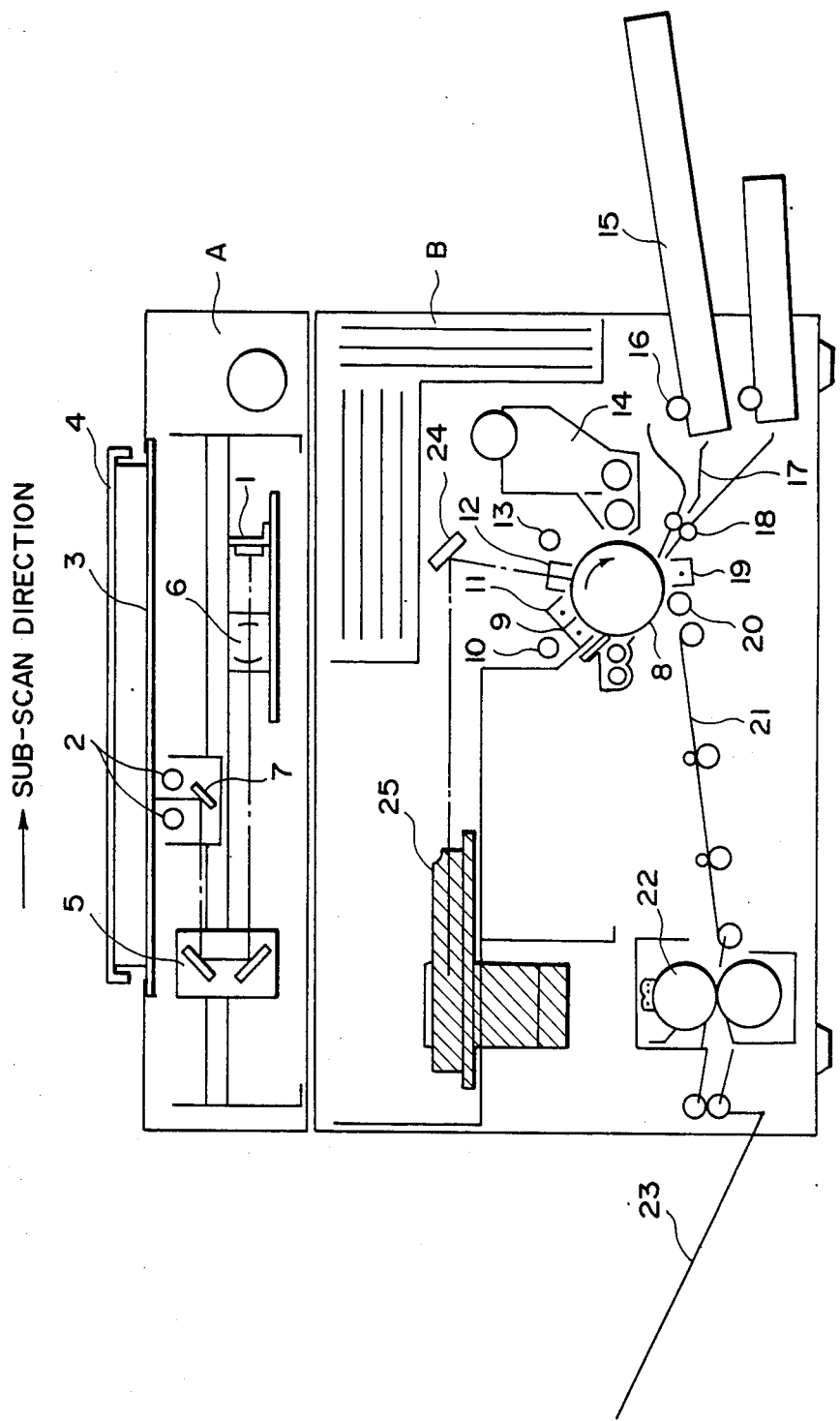
FIG. 3 is a cross-sectional view of the apparatus shown in FIG. 1.

FIG. 3 shows a cross-sectional view of the reader A and the reader B. An original is placed, with the front face thereof downwards, on an original supporting glass 3, at left rear corner thereof, and is pressed against said glass by an original cover 4. The original is illuminated by a fluorescent lamp 2, and an optical path is formed to guide the reflected light onto a charge-coupled device CCD1 through mirrors 5, 7 and a lens 6, wherein said mirrors 7 and 5 are moved with a speed ratio of 2:1. The above-described optical unit is moved from left to right at a constant speed by a DC servo motor. The moving speed is 180 mm/sec in the forward movement in which the original is illuminated, and 468 mm/sec in the backward movement. The resolving power in this subsidiary scanning direction is 16 lines/mm. The processable original size ranges from A3 to A5, and an original of A5, B5 or A4 size is placed in a vertically long orientation while an original of B4 or A3 size is placed in a laterally long orientation. The optical unit is reversed according to the original size, when reader signals VIDEO ENABLE, counted by an electric sensor to be explained later, reach a determined count corresponding to the original size.

The main scanning width is 297 mm (FIG. 11) which is equal to the width of an A4-sized original placed in a laterally long orientation. In order to attain a resolving power of 16 pel/mm, there are required 4752 (=297×16) bits, which are provided in the present embodiment by two 2688-bit CCD array sensors driven in parallel. Consequently, based on the conditions of 16 lines/mm and 180 mm/sec, the main scanning period, or the charge accumulating time, of each CCD, is equal to $T=1/vn=1/180\times 16=347.2$ microseconds, and the transfer rate of a CCD is equal to $f=N/T=2688/347.2=7.741$ MHz.

Now there will be explained the printer B provided under the reader A in FIG. 1. Bit-serial video signals processed in the reader A are supplied to a laser scanning optical unit 25 in said printer. Said unit comprises a semiconductor laser, a collimeter lens, a rotary polygonal mirror, an F-$\theta$ lens, and an image correcting optical system. The image signals from the reader are supplied to the semiconductor laser for electrooptical conversion, and the emitted light is converted into a parallel beam by the collimeter lens and directed to the polygonal mirror rotated at a high speed for scanning the photosensitive member with said laser beam. Said polygonal mirror is rotated at a speed of 2,600 rpm and covers a scanning width of ca. 400 mm, with an effective scanning width of 297 mm equal to the length of the A4 size. The signal frequency supplied to the semiconductor laser is about 21 MHz (NRz) as will be explained later. The laser beam from said unit is introduced into the photosensitive member 8 through a mirror 24.

The photosensitive member 8 has for example a three-layered structure, consisting of a conductive layer, a photosensitive layer and an insulating layer, and is associated with process components for image formation, including a preliminary charge remover 9, a preliminary charge removing lamp 10, a primary charger 11, a secondary charger 12, an exposure lamp 13, a developing unit 14, a paper cassette 15, a sheet feeding roller 16, a sheet guide 17, a registration roller 18, a transfer charger 19, a separating roller 20, a transport guide 21, a fixing unit 22 and a tray 23, which in combination produce a copy through an already known electrophotograhic process. The speed of the photosensitive member 8 and of the transport system is 180 mm/sec, which is the same as the scanning speed of the reader. Consequently the copying speed obtained by the combination of the reader and the printer is 30 copies/min. for A4-sized copies. The above-mentioned feeding roller 16 and registration roller 18 are controlled by signals from the reader.

Figure 14A:
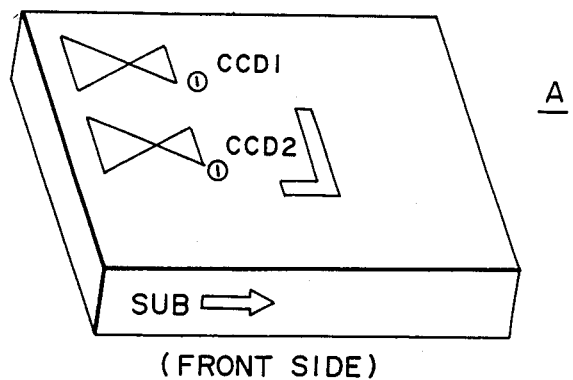
FIGS. 14A and 14B are schematic views explaining main and subsidiary scanning.
Figure 14B:
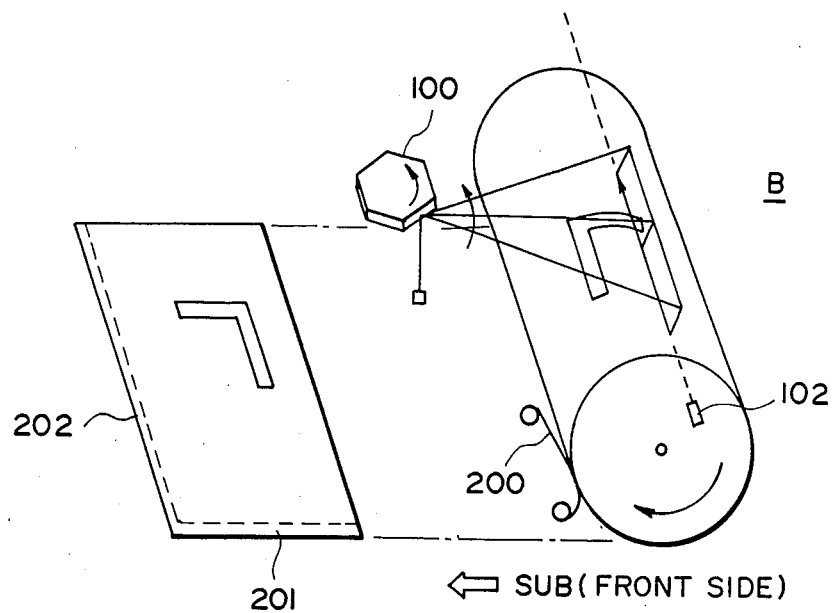

The printer uses a separating belt 200 (FIG. 14B) for separating the copy sheet maintained in contact with the photosensitive drum, and for this reason an image does not appear in the area 201 corresponding to said belt. If the image signals are given for these areas and developed, the toner will be deposited on said belt and will stain the subsequent copy sheet. Therefore the reader eliminates the image signals in this area of 8 mm width, corresponding to the belt width. Similarly the signals are eliminated in an area 202 (FIG. 14B) 2 mm long at the leading end of the copy sheet, since the toner deposited in said leading end will cause the sheet to adhere to the fixing roller in the fixing unit, thus leading to a sheet jamming. FIGS. 14A and 14B show the direction of main scanning in the reader and the printer, in combination with an output image. The main scanning is made from rear to front in the reader, and in the opposite direction in the printer.

The copying apparatus of the present embodiment has certain intelligent function such as image editing, which is achieved by processing in the reader on the signals obtained from CCD's. The signals supplied from the reader always have 4752 bits and are of a constant rate in any operating mode. Said intelligent performance includes a magnification or reduction function with determines image size ratios or with an arbitrary image size ratio in a range from 0.5 to 2.0 times, an image trimming function for extracting a designated area of the image, an image moving function for moving a thus trimmed image to an arbitrary position on the copy sheet, a function of magnifying or reducing a thus trimmed image with an arbitrary image size ratio or with an image size ratio matching the copy sheet size, and a detecting function for recognizing the original placed on the original supporting glass. In addition a halftone processing (AE function) with 32 levels is possible by appropriate key operation, and these intelligent functions may be combined as will be explained later in relation to FIG. 16.

Figure 16A:
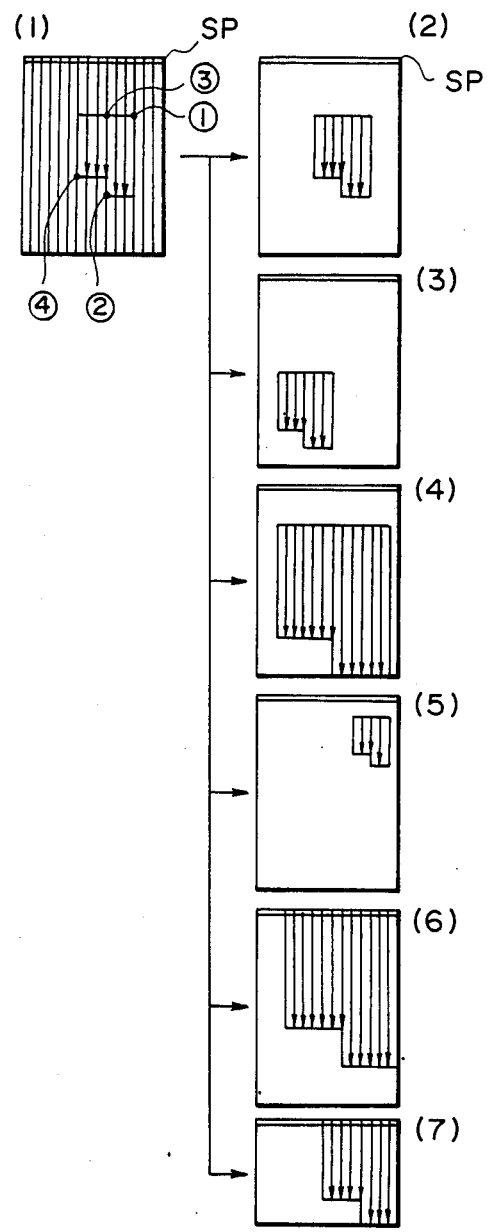
FIGS. 16A, 16B and 16C, is a schematic view showing an example of the image conversion.

FIG. 16A shows the image editing function, wherein (1) indicates the original, (2) a copy obtained with the designation of trimming coordinates alone, (3) a copy obtained with the designation of trimming coordinates and of image moving coordinates (an error indication being given if the coordinates entered would result in moving the image to a location beyond the copy sheet edge), (4) a copy obtained with the designation of trimming coordinates and of image moving coordinates combined with image magnification at an arbitrary image size ratio (an error indication being given if the image exceeds the copy sheet boundaries), (5) a copy obtained with the designation of trimming coordinates and of image moving coordinates combined with image reduction at an arbitrary image size ratio, (6) a copy obtained with the designation of trimming coordinates combined with an automatic copying mode in which the size of the trimmed image is automatically changed to match the sheet size within an image size ratio from 0.5 to 2.0 times and according to the orientation of the sheet cassette, and (7) a copy obtained with the designation of trimming coordinates combined with an automatic copying mode for a small-sized sheet. The trimming coordinates to be shifted to the image moving coordinates are determined with reference to a point (1) where the coordinate value in the subsidiary scanning direction is smallest.

In the embodiment are provided further functions, such as automatic size modification, cornering, centering, printing two pages of an open book on separate sheets without book movement, etc., as described below.

Figure 16B:
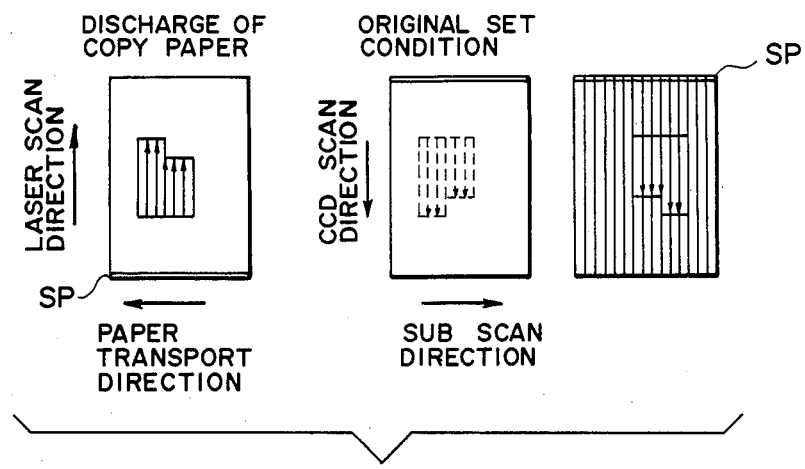
Figure 16C:
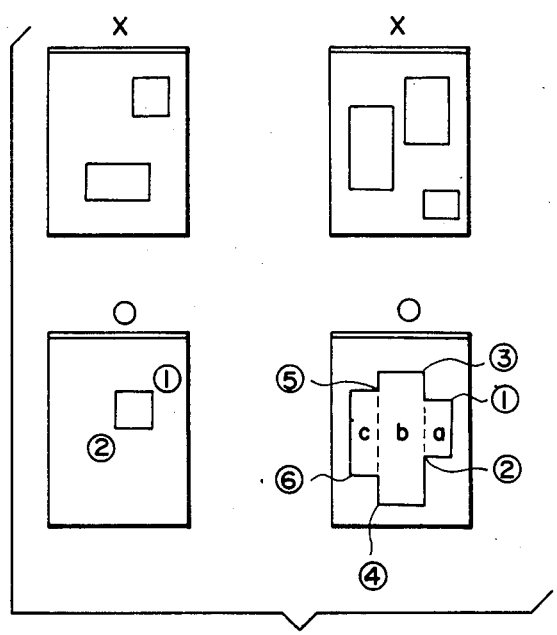

FIG. 16B shows the relationship between the main scanning directions of the CCD's and of the laser, and FIG. 16C shows the procedure of designating the trimming coordinates. A frame defined by linear lines is designated in the order from (1) to (6), with numeral keys 12a shown in FIG. 4, by dividing said frame into three rectangles a, b and c and designating the points on a diagonal in each rectangle.

Figure 2:
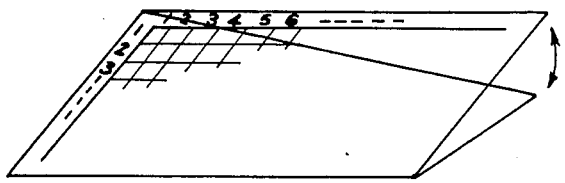
FIG. 2 is a perspective view of a document holder.

FIG. 2 shows a transparent holder A-2 (see FIG. 1) which can be inserted between the original cover 4 and the glass 3. The holder is of a bag-like form bonded at two edges, and has a width the same as that of the glass 3. A section pattern is drawn on one side of said holder, and coordinate marks 1-n and 1-m are indicated at intervals of 1-10 mm on the vertical and horizontal edges, respectively, of said section pattern. The coordinate points correspond to the points on the glass. When the original is inserted into said bag-like holder with the image bearing face toward the coordinate face, the respective points on the original image are indicated by the coordinates. Thus, the operator can enter the trimming coordinates and the image moving coordinates by means of the keys of the operation unit A-1 while observing the holder. After the key entry operation, the original is turned over, again inserted in the holder and placed in a predetermined position on the glass, or the original is taken out of the holder and placed on the glass. If the coordinates are drawn with a color not detectable by the CCD's the original can be placed on the glass together with said holder. The holder may instead have one or three bonded edges. A holder with one bonded edge, namely a holder made of a folded sheet, allows the operator to designate coordinates even for a thick or bound original.

Figure 4A:
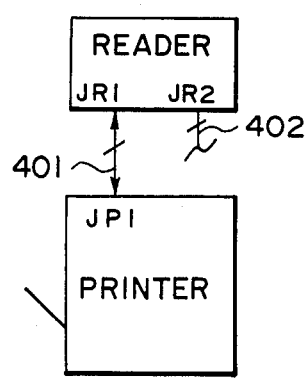
FIGS. 4A and 4B (FIG. 4B comprising FIGS. 4B-1 and 4B-2) are block diagrams showing a local network to which the apparatus of FIG. 1 is connected.
Figure 4B:
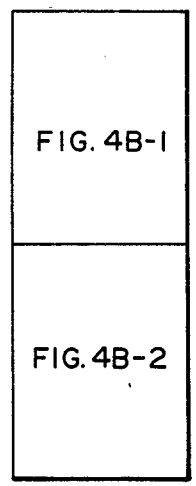
Figures 1, 4B:
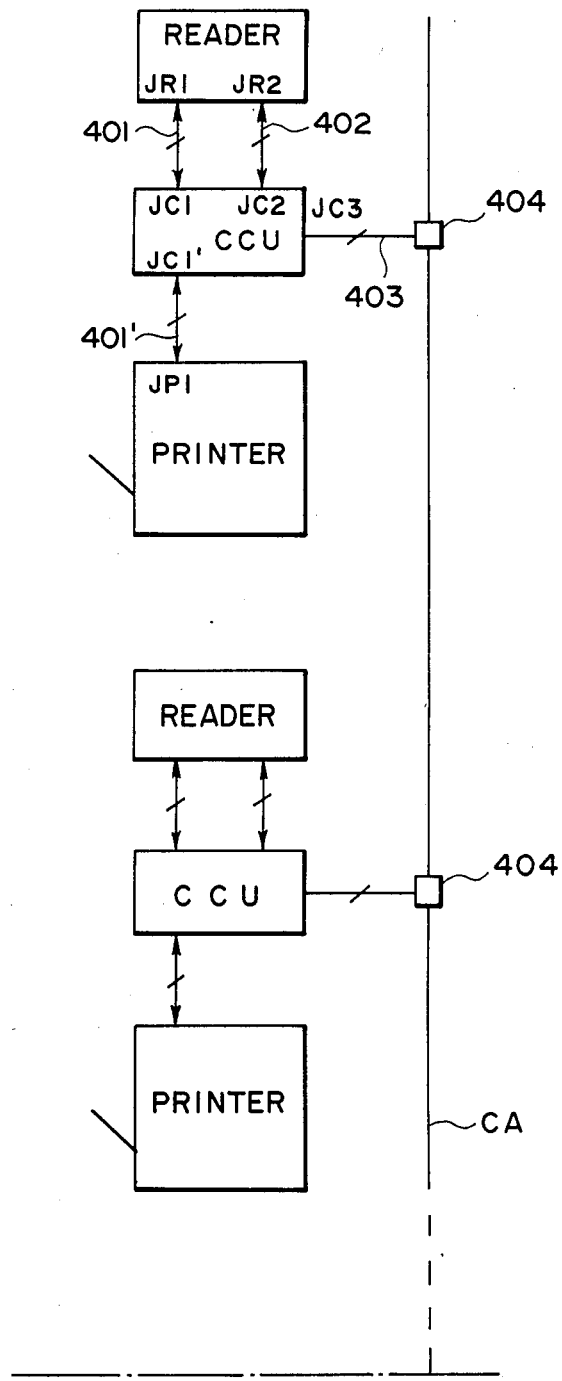
Figures 2, 4B:
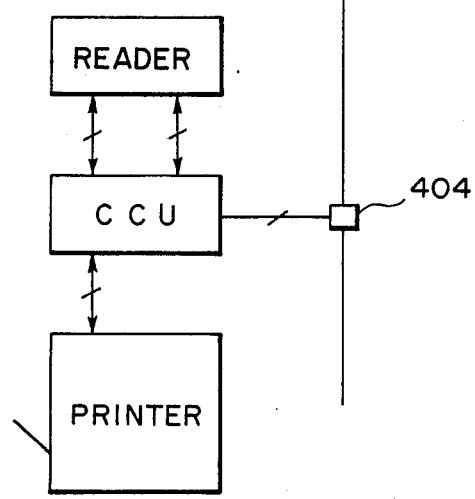

FIGS. 4A and 4B are diagrams showing examples of a network constituting an electronic mail system for example connecting a main office and a branch office, wherein each reader and printer are connected through a communication control unit (CCU) which in turn is connected to the network of a bus structure utilizing coaxial cable CA.

Figure 5:
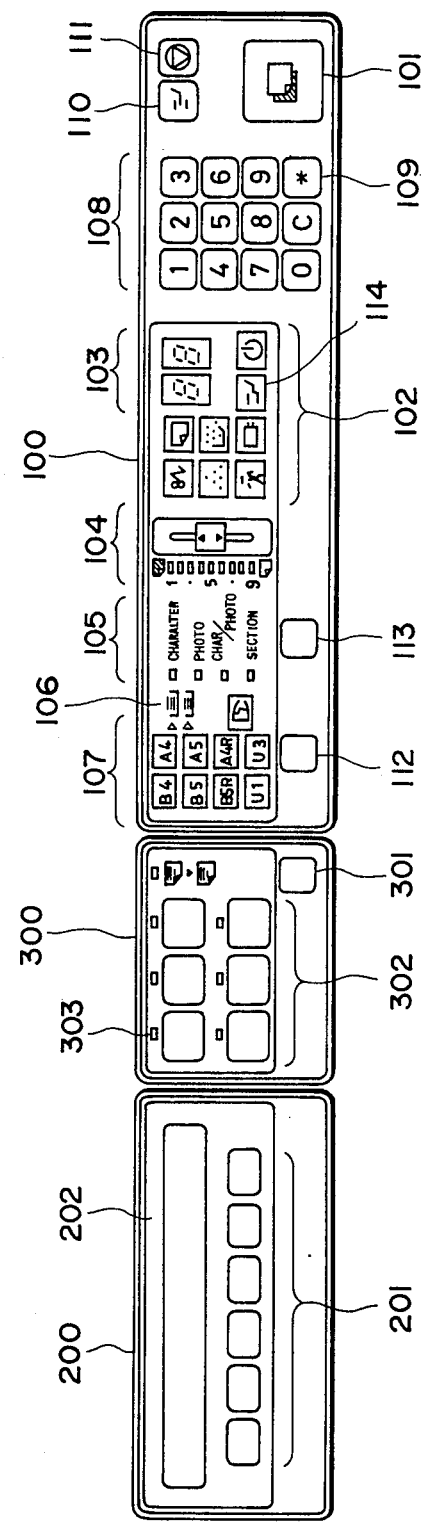
FIG. 5 is a plan view of an operation unit of the apparatus shown in FIG. 1.

When the reader and the printer are connected as a stand-alone structure, a connector JR1 of the reader is connected to a connector JP1 of the printer through a cable 401 as shown in FIG. 4A. On the other hand, when the reader and the printer are to be connected through the network, the connection between JR1 of the reader and JP1 of the printer is made through connectors JC1 and JC1' of the CCU as shown in FIG. 4B. This structure allows optional connection of the CCU for providing a part of the signals exchanged between the reader and the printer to the CCU for the purposes of control, without any change in the hardware of the reader and the printer. The reader is provided also with a connector JR2 for exchanging, with the CCU, instructions relating to communication, required when the reader is connected with the CCU. The operation unit of each reader is equipped with keys and display units, as shown in FIG. 5, for carrying out communicating functions. The CCU is further provided with a connector JC3 for connecting a cable 403, leading from the communication cable constituting the network to the CCU which is usually installed in the pedestal part of the printer. To the network cable is connected a transceiver module 404 integrally composed of a connector which is pressure connectable to the coaxial cable and of a modulation-demodulation circuit. This network is controlled by a so-called token passing system.

Now there will be explained the functions of the apparatus of the present embodiment. In addition to the simple copying function, said apparatus is capable of an image size modifying function for arbitrary image magnification or reduction, an editing function for extracting an arbitrary part of the original, the function of automatically detecting the size and position of the original and automatically modifying the image size and editing the image etc. Such functions of controlling the original image shall be collectively called "image control functions". In addition to simple copying in the printer of an original image read in the reader, the present apparatus can transmit the original image to other printers through said communication control unit (CCU), and can receive original images transmitted from other readers. Such functions shall be collectively called "image transmission functions". Furthermore, functions selected from the foregoing may be arbitrarily registered by means of six preset keys, and such registrations are retained even when the power supply is interrupted. Such functions shall be called "preset functions". Furthermore, the present apparatus is capable of an automatic exposure function for eliminating the background color of the original, and an intermediate tone processing function for faithfully reproducing a continuous-toned original such as a photograph, and these functions shall be collectively called "image quality processing functions".

In summary the image control functions include following five functions:

an image size modifying function for equal size copying (size ratio 100%), determined copy size modifications (at designated copy sizes), continuously variable copy size modifications (size ratio from 50 to 200%), and X-Y copy size modifications (copy size independently variable in the main and subsidiary scanning directions);

an image inverting function for reproducing the original image or producing a positive-to-negative inverted image;

editing functions for producing an image either without editing; or with white or black masking, in which the X-Y size modification mode is automatically adopted; or with white or black frame trimming; or with automatic original position detection, which is linked with the functions of size modification, image inversion, image displacement and special size modification;

image displacing functions for producing an image either without displacement; or with designated destination of displacement; or with a movement of a specified original point (cornering); or with centering;

special image size modifying functions for producing an image either without any size modification; or with automatic size modification; or with automatic X-Y size modification, in the last two of which no other size modifying mode can be selected at the same time. The image displacing functions and the special size modifying functions are rendered effective only when the white or black frame trimming mode or automatic original position detection mode is selected from among the editing functions.

The image transmission functions include local (ordinary) copying mode, transmission mode (for transmitting the original image to another printer through the CCU), and reception mode (for receiving the original image from another reader through the CCU).

The present functions include registration (for storing editing data, etc., with preset keys), read-out (for reading the stored data with preset keys), and resetting (for returning the function to the standard mode).

The image quality processing functions include automatic exposure mode (AE), and intermediate tone processing mode. The original image subjected to image controlling functions or image quality processing functions may be transmitted through the CCU for printing in another printer.

FIG. 5 shows the details of the operation unit A-1 shown in FIG. 1, composed of three blocks: a right-end block 100 including keys and displays already known in conventional copiers, a central block 300 including function keys and displays for recalling the copying-transmitting functions arbitrarily prepared and stored by the operator in advance, and a left-end block 200 including program keys and displays for arbitrarily creating the copying-transmitting functions. The general key-display block 100 is provided with 7-segment LED display units 103 for indicating the desired copy number and the copy count in operation; alarm indicators 102 for indicating sheet jamming, lack of toner, lack of paper, interruption copy mode, etc., as already known in conventional copiers: a copy density adjusting level and a corresponding density indicator 104; original selectors 105 for indicating whether the original contains characters only, photographs only, characters and photographs in combination, or is drawn on a section paper, in order to apply optimum image processing to each of these four different types of originals; an indicator 106 for indicating whether the upper or the lower cassette is selected; an indicator 107 for indicating the sheet size stored in the selected cassette; numeral keys 108 for entering the copy number to the display unit 103 or for entering figures in the course of program preparation in the program key-display block 200 (for example for designating the trimming coordinates, image moving coordinates, image size ratio, transmission address, etc.); an entry key 109 for confirming the key entry made in said block 200; an interruption key 110 for interrupting a multiple copying operation to start another copying operation; a copy cancel key 111 for interrupting a multiple copying operation in the printer or interruption signal reception; a copy key 101 for starting the copying operation in the printer or starting the signal transmission; an original selecting key 113 connected with the indicator 105; and cassette selecting key 112, the last two keys shifting the display upwards stepwise at each actuation. The function key-display block 300 is provided with six function keys 302 of registering six different functions, wherein each of said keys is provided with a detachable top for enabling the operator to inscribe a title for the registered function. When a function is created by the operator through the program key-display block 200, a display unit 202 thereof displays a message whether or not to register said function. Then in response to the actuation of a program key 201, six indicators 303 of the block 300, corresponding to said six program keys, start to flicker, indicating an enquiry from the apparatus as to which key the aforementioned function should be registered in. Upon actuation of one of the keys key, the corresponding indicator is lighted while the other indicators are extinguished. The operator then detaches the cover, inscribes the title of the function on the key and mounts the cover again. Thereafter the registered data are retained even when the power supply is cut off, since the memory is backed up by a battery. A key 301 is used for returning to the standard mode.

An indicator 114 is lighted when the interruption key 110 is actuated, and flickers in the reception mode to indicate the reception of image signals from another station and to prohibit initiation of the copying operation by the copy key 101. During the reception mode, data setting and registration through the blocks 200, 300 are enabled. Thus, after or during the reception mode, in response to the actuation of the copy key 101, the liquid crystal display unit 202 displays the content of received data, namely the address of the sending station, the total number of received copies and the copy count in operation. Upon actuation of the clear key C, said display is replaced by a display of standard mode or of data set prior to the actuation of the copy key 101. In response to the actuation of the cancel key 111 during the reception of multiple copies, the sheet feeding is terminated and the printing operation is interrupted after the copying cycles are completed for the sheets already present in the transport path. Also a message of such interruption is displayed on a liquid crystal display unit of the sending station.

Now there will be given a detailed explanation on the reader unit, while making reference to a block diagram shown in FIG. 6, including interface signals at right. The connector JR1 of the reader is connected to the connector JP1 of the printer for making connection between the two. For additionally achieving external communication, the signals to be supplied from the connector JR1 to the connector JP1 are once supplied instead to the connector JC1 of CCU and transmitted from the connector JC1' thereof to said connector JP1. Separately, the connectors JR2 and JC2 are connected to each other for transmitting protocol signals. Interface signals through JR1 have timings shown in FIGS. 7 and 8. A beam detect signal BD, corresponding to the front end signal of each line, is used for synchronizing the scanner (polygonal mirror 100 in FIG. 14B) when the printer is connected with the reader, and is released from a beam sensor 102 at a side of a recording drum when it is hit by the laser beam. Image signals VIDEO, CLK are released at a rate of 4752 pixels per line with a duration of 55 ns per pixel, wherein each pixel is capable of representing three states "0", "½" and "1" according to the image density. More specifically, a state "0" is represented by an L-level state for a duration of 55 ns, "½" by an H-level state for 27.5 ns followed by an L-level state for 27.5 ns, and "1" by an H-level state for 55 ns. In this manner half tone reproduction with multiple density levels can be achieved without sacrificing the resolving power, since the image signals are formed by mixing pulse width modulation with dither treatment. Said signals are produced either in synchronization with the beam detect signal when the printer is connected, or in synchronization with a similar signal generated by an internal oscillator in other cases, for example in the transmission to another station. A signal VIDEO ENABLE is produced during the output of 4752 bits of said image signals, in synchronization either with said beam detect signal or with another similar signal. The signal read-out from the CCD is precisely controlled by a signal HSYNC prepared through an AND gate from the signal BD and clock signals $\phi 1$. A signal VSYNC, indicating the start of image signals, is released in synchronization with the output signal from an image front end detection sensor 37b and the beam detect signal or a similar internal signal, and has a duration the same as that of the VIDEO ENABLE signal. A signal PRINT START instructs the start of sheet feeding to the roller 16 in the printer. The interval between the signals PRINT START and VSYNC, or between the signal VSYNC and the sensor 37b in case the registration roller 18 is controlled by said signal VSYNC, is determined by a control circuit (FIGS. 10, 13) in consideration of the image size ratio and of the image trimming area. A signal PRINT END, indicating the completion of a copying operation in the printer, is released when the rear end of a copy sheet leaves the photosensitive drum and is supported on the conveyor belt. This signal indicates the completion of separation of the copy sheet, and is released at a timing in the control sequence. This signal is used for the increment of the copy count, and for correcting the number of lost copies in the case of a sheet jamming. A signal ABX CONNECT indicates the connection of the CCU, whereupon the corresponding terminal is grounded in the CCU unit to enable the communication. A signal PRINTER CONNECT is released when the printer is connected. In the printer the corresponding terminal is grounded, whereby the printing operation is enabled.

Figure 8:
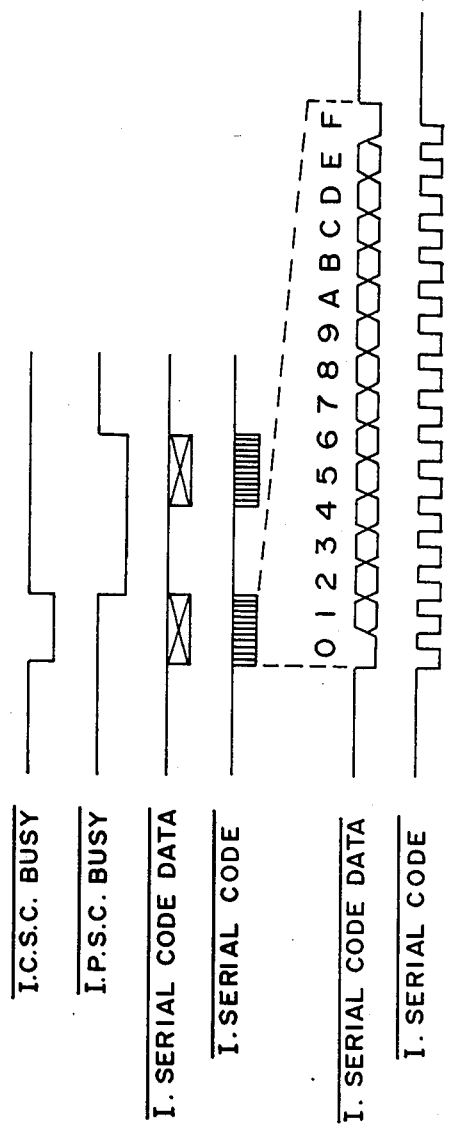

Serial signal lines S. DATA, S. CLK, CSC BUSY, PSC BUSY are used for protocol exchange between the reader and the printer as will be explained later. S. DATA and S. CLK are respectively protocol data and clock signals, both 16-bits and bidirectional. The signal CSC BUSY is released when the reader releases said data and clock signals, and the signal PSC BUSY is released when the printer releases said data and clock signals. Consequently these signals indicate the direction of transmission of the signals S. DATA and S. CLK. Reference should be made to FIG. 8 for the detailed timings of these signals. These signals ensure efficient and exact operation of the reader and the printer regardless of whether they are connected directly or through optical fibers, etc.

Reference is again made to FIG. 6A for explaining the blocks constituting the reader. A CCD reading unit 601 or 601' comprises a CCD, a clock driver therefor, an amplifier for the signals from CCD and an A/D converter for A/D conversion of said signals. Control signals to said CCD's are generated by CCD control signal generators 603, 603' and supplied to clock drivers in the CCD reading units 601, 601', said control signals being generated in synchronization with the horizontal synchronization signal BD from the printer. The CCD reading units 601, 601' supply image signals converted into 6-bit digital signals to image processing units 602, 602'.

Said image processing unit 602 or 602' comprises a sampling circuit for sampling the output signals of CCD in order to control the light intensity from the light source; a circuit for detecting the shading caused by the light source and the lens; a correcting circuit therefor; a peak-hold circuit for detecting the peak light intensity in each main scanning for automatic exposure function; and a digitizing circuit for binary or trinary digitizing of 6-bit image signals after shading correction, according to slicing levels determined in response to the peak hold value or the dither pattern in the immediately preceding line or in a line immediately preceding said line. The image signals digitized in the image processing units 602, 602' are supplied to image editing units 604, 604'.

The image editing unit 604 or 604' comprises a buffer memory of 2 lines, in which each line has a capacity larger than twice 4752 pixels. Such capacity is required because the amount of signals is doubled when the image signals are stored in the memory with a doubled sampling rate for achieving an image size ratio of 200%. Also, two memories are provided in order to write the image signals of an N-th line into the first memory while the image signals of an (N−1)-th line are read from the other memory.

In said unit there are further provided a write address counter for writing the image signals into said buffer memories, a read address counter for signal readout and an address selector circuit for switching the address signals from said two counters. Said counters are of parallel loading type with presettable initial value, to be loaded to an input/output (I/O) port from a central processing unit (CPU). The CPU enables the image editing by presetting, according to coordinate information provided from the operation unit, addresses corresponding to the main scanning coordinate to said counters each time the subsidiary scanning reaches a line corresponding to the trimming coordinates.

There are further provided a coordinate area control counter and a gate circuit for realizing the white masking, black masking, white frame trimming and black frame trimming modes.

There is further provided a junction detecting shift register for automatic junction correction for the CCD's. A synthesizer unit 605 switches the image signals from the image editing units 604, 604' for obtaining continuous serial image signals.

An original detecting unit 606 executes a pre-scanning of the original during the drum prerotation step of the printer after the copy key is actuated, thereby detecting of the coordinates of the position of the original, and comprises a shift register for detecting 8 consecutive white bits, an I/O port and a main/subsidiary scanning counter.

An operation unit 607 comprises a key matrix, LED display units, liquid crystal display units and liquid crystal drivers. There are further shown a DC motor 608 for driving the optical system; a driving circuit 609 therefor; a fluorescent lamp 610 for illuminating the original; a driving circuit 611 therefor; a photosensor 612 for detecting that the optical unit is at a home position; and a photosensor 613 for detecting that said optical unit is in a position for illuminating the leading end of the original. The CPU 614 comprises a microprocessor, a ROM, a RAM, a battery back-up circuit, a timer circuit and an I/O interface.

The CPU 614 controls the operation unit 607, and, in response to the instructions from the operator, executes the sequence control of the reader and simultaneously releases commands and image signals for controlling the printer. In addition, in response to the instructions for image processing from the operation unit 607, the CPU executes data setting in the various counters of the image processing units 602, 602' and the image editing units 604, 604' prior to or during the original scanning operation. Furthermore the CPU controls, prior to the original scanning operation, the fluorescent lamp driving circuit 611 according to the light intensity data from the image processing unit, sets the speed of the DC motor driving circuit 609 according to the instruction of image size ratio, and calculates the image junction from the data obtained from the image editing units 604, 604'.

Figures 2, 6A:
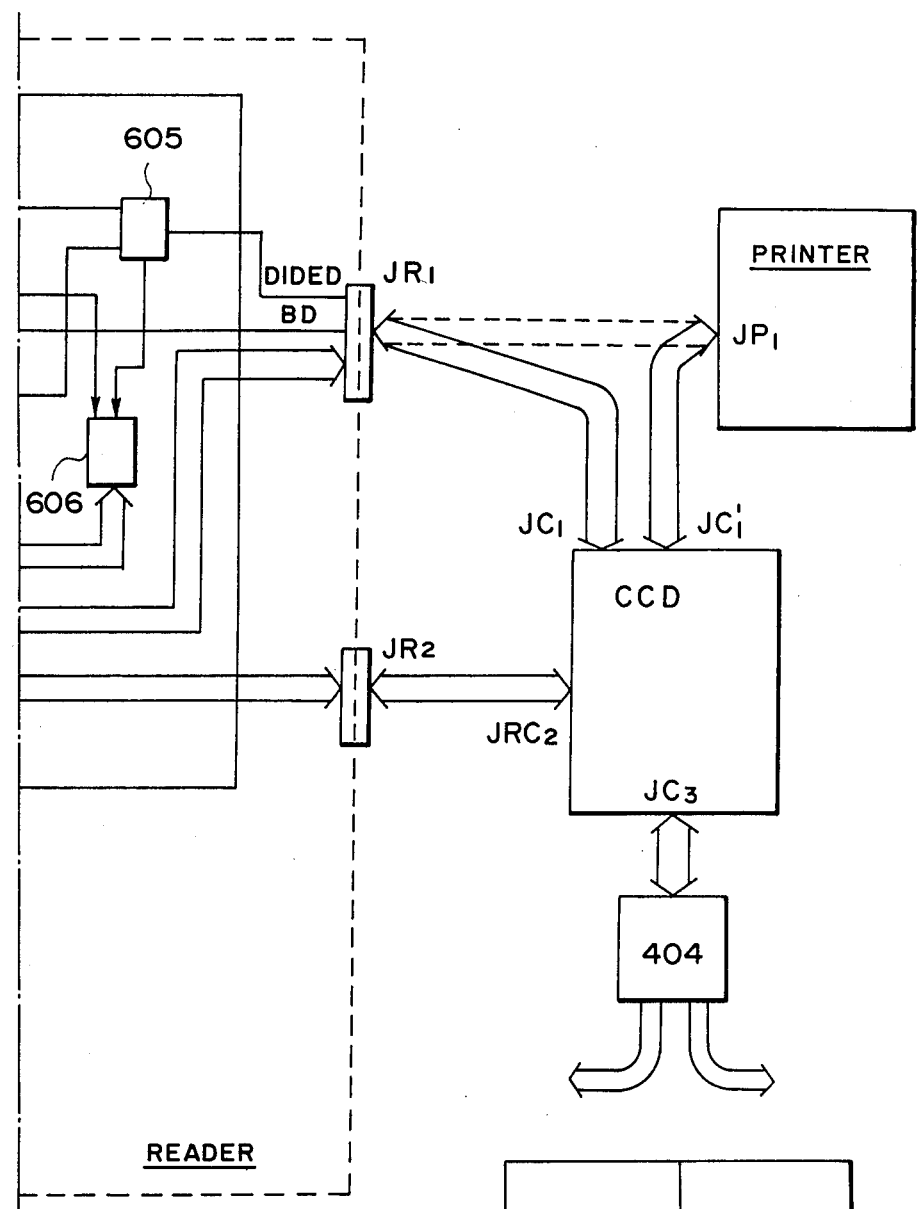
FIG. 6A, comprising
Figure 6A:
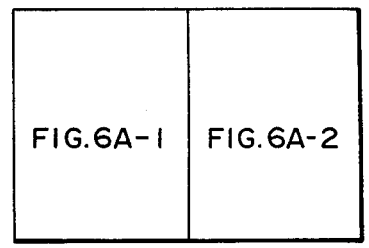
Figures 1, 6A:
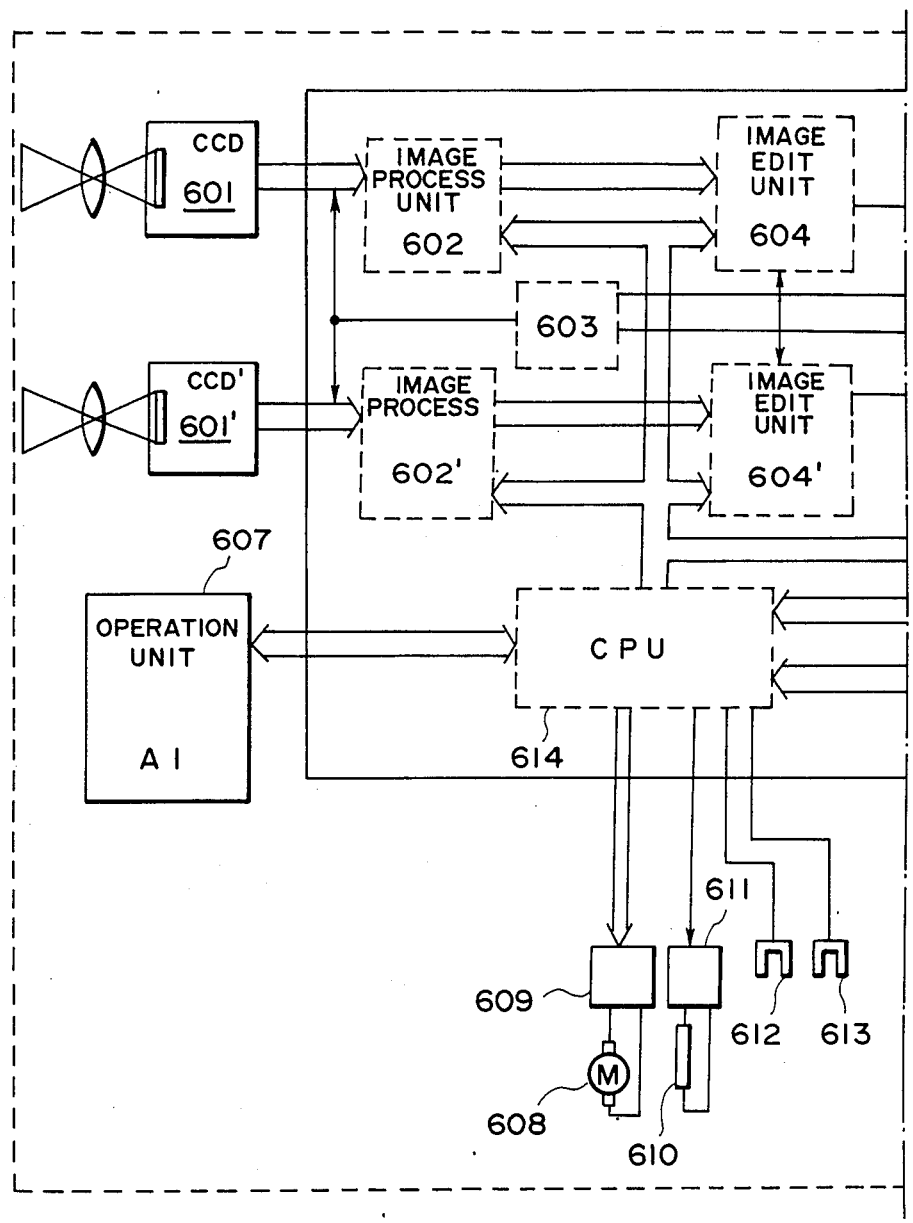
Figure 6B:
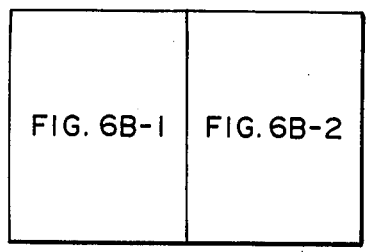
FIG. 6B, comprising
Figures 1, 6B:
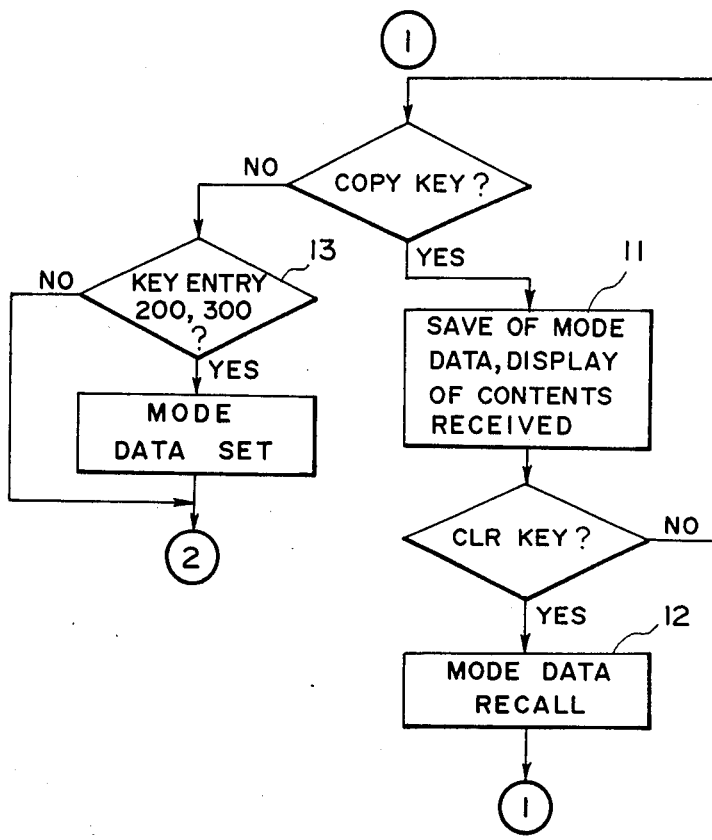
Figures 2, 6B:
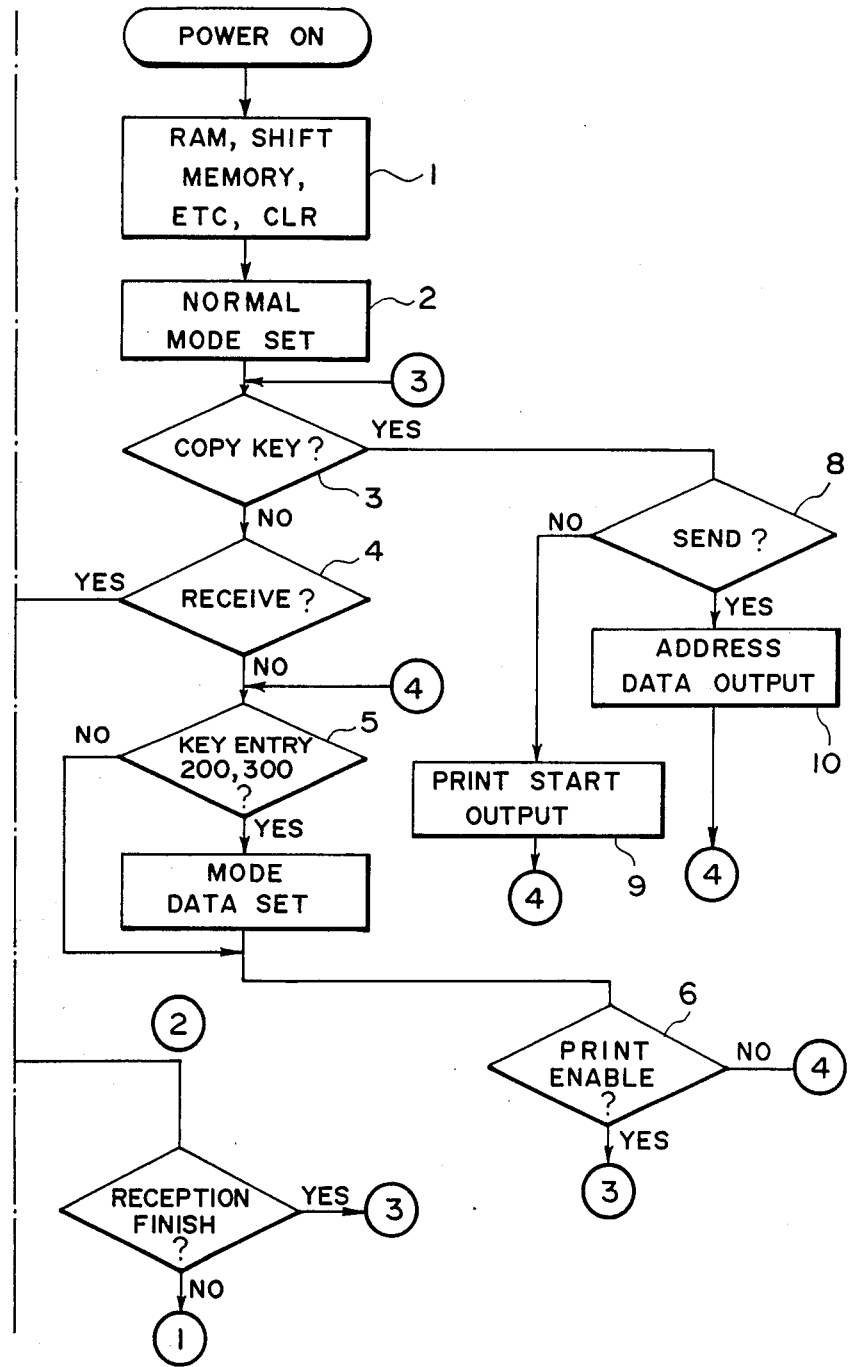

FIG. 6B shows a flow chart for controlling key operations in the operation unit 607 by the CPU 614. In response to the actuation of a power switch of the reader, there are conducted the resetting of shift registers, RAM, etc., setting of data indicating a mode for equal size copying, without editing, without image inversion and without transmission into a memory of the liquid crystal display unit 202, and setting of data selecting the lower cassette, a character original and a single copying, corresponding to the standard mode. This procedure is executed also when the interruption key 110 or reset key 301 is actuated. Then a step 3 identifies the actuation of the copy key, and, if negative, a step 4 identifies whether the reception mode is selected. If the result is negative the program proceeds to an entry routine (5) for the operation blocks 200, 300. After the setting and registration of mode and data by said blocks 200, 300, a step 6 identifies whether the printer is ready for copying operation, and, if affirmative, the program proceeds to a copy key routine. If the copy key is actuated, a step 8 identifies whether the transmission mode is selected by a program key or a preset key, and, if negative, a step 9 is executed to supply the print start signal to the CCU. If the transmission mode is selected, a step 10 is executed to supply the CCU with data necessary for transmission, such as the address data.

In the reception mode, the transmission and the copying operation are prohibited even when the copy key is actuated. The mode data display is diverted into a certain area in the memory, and the display unit 202 instead displays the received data in a step 11. Upon actuation of the clear key, a step 12 is executed to revive said mode data display. Prior to the actuation of the copy key, key entries from the blocks 200, 300 and corrections thereof are enabled in a step 13. Upon completion of the reception in a step 14, the program proceeds to the copy key routine in the step 3 thereby enabling the copying operation. In the case that the cancel key 111 is actuated in the step 13, the program proceeds, after a determined time, to the step 3, thus interrupting reception. When the clear key is actuated in the step 13, numeral data are cleared but mode data entered by program keys are not reset. The actuation of the key 301 performs the resetting to the standard mode.

Figures 7, 7B:
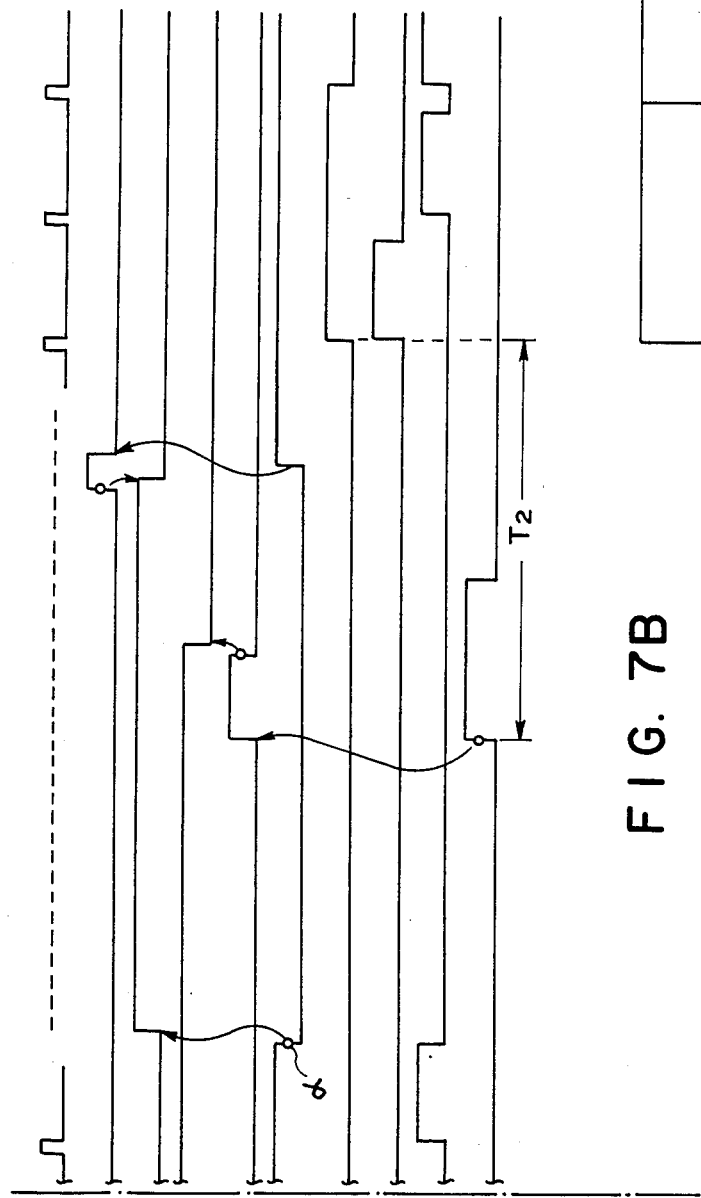
FIGS. 7 (comprising FIGS. 7A and 7B), 8 and 9 are timing charts of the circuit shown in FIG. 6A.
Figure 7A:
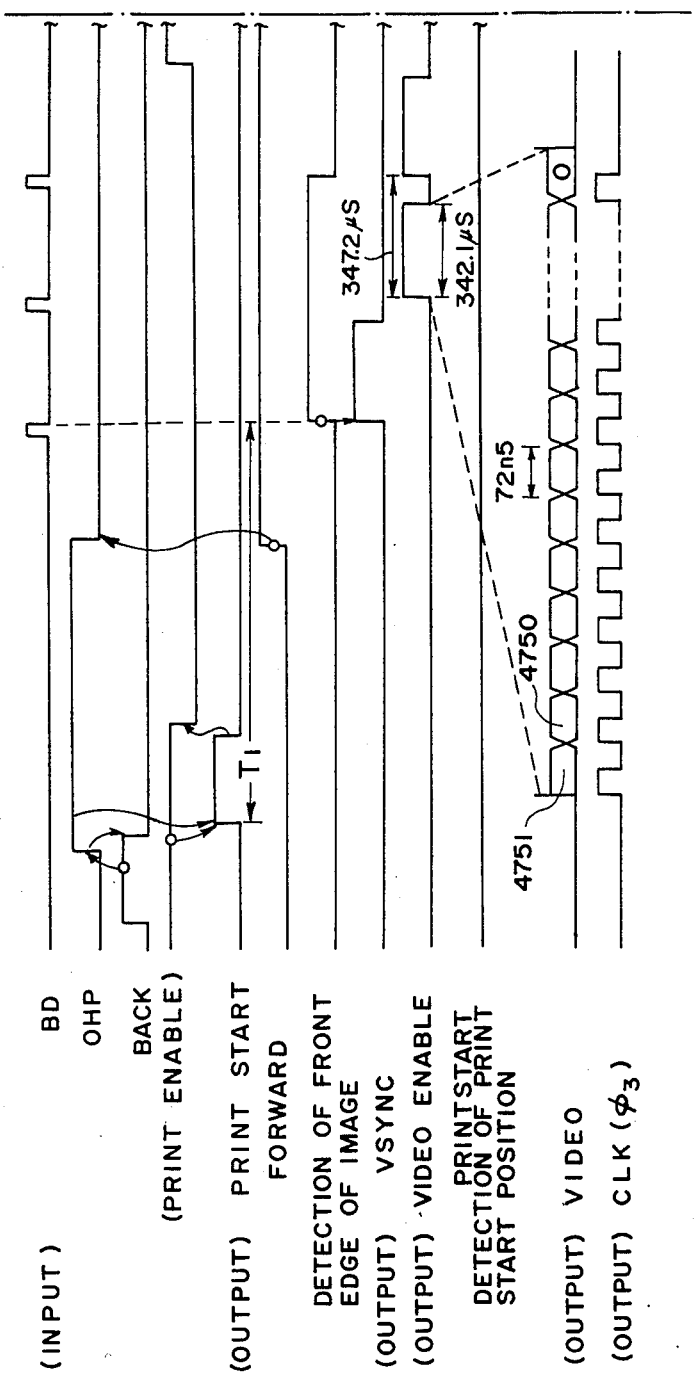
Figure 9:
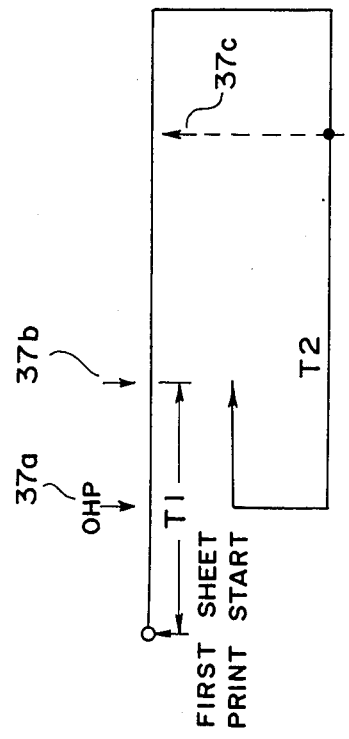

The sequence control procedure is now explained with reference to FIGS. 7 and 9. As shown in FIG. 9, three position sensors 37a–37c are arranged on the scanning optical system of the reader. As viewed from the front side of the reader, an optical system home position sensor (for producing a signal OHP) is at the leftmost position where the optical system is normally stopped. When the reader is driven, the optical system starts scanning motion from left to right. An image leading end sensor 37b is arranged at a reference position SP of the image. In response to a signal from the sensor 37b, the control circuit releases the image signals VIDEO, CLK in synchronization with the signal BD and the signal VIDEO ENABLE indicating an effective signal period in each main scanning cycle (347.2 microseconds). In the first line, however, said signal VIDEO ENABLE is not produced since the CCD signals are stored in the shift memory. In response to the signal from the sensor 37b, the control circuit starts to count the number of said VIDEO ENABLE signals, and, when the count reaches a count $\alpha$ corresponding to a coordinate obtained by detecting the position of the original, the control circuit terminates an optical system forward driving signal and releases a backward driving signal, thereby reversing the optical system. At this point, the control circuit identifies if the optical system has made scanning cycles of a set copy number, and, if not, releases the print start signal for instructing the next paper feed to the printer. The position of the sensor 37c should be so adjusted that T2 and T1 in FIG. 9 are equal.

Image Magnification/Reduction

The method for image magnification or reduction will now be explained, with reference to FIG. 10D. A change in image size in the sub-scanning direction is basically achieved through the variation of the speed of the DC servo motor 37d. The CPU calculates the speed based on an entered image magnification ratio, also calculates a PLL frequency corresponding to the speed and presets it in an I/O latch (1) 58 prior to the scanning operation. During the reverse motion, a fixed value is set so as to move the optical system in reverse at a high speed. It is done by presetting a value stored in the ROM of the CPU to the I/O latch (1). Thus, the speed for an image magnification ratio of 2 is equal to half of that for equal-size copying (180 mm/sec), and the speed for an image magnification ratio of ½ is equal to twice the above-mentioned speed. The main scanning is carried out by sampling, at a clock rate determined by the image magnification ratio, the CCD serial signals of a fixed frequency after the A/D conversion. For example, if the image magnification ratio is 2, the serial signals are sampled at a clock rate which is equal to twice the CCD clock rate so that the resulting signals include one additional bit for each CCD, and if the image magnification ratio is ½, the serial signals are sampled at a clock rate which is equal to half of the CCD clock rate so that every other bit in said signals is omitted. The CPU calculates the clock rate based on the designated image magnification ratio and set it in an I/O latch (2) 50 prior to the sub-scanning operation. As described above, each CCD has 2688 bits, of which 96 bits are dummy bits and 2592 bits are effective bits. Driving signals of a frequency of 7.75 MHz are supplied through a $\phi 1$ clock line 55. Clock signals $\phi 2$ for image size modification are generated by synchronizing the clock signals from the same source as that of the clock signals $\phi1$ with a frequency generated by a VCO (9) based on the content of the I/O latch (2), through a PLL 48 to produce a variable frequency. The 2592-bit analog signals from the CCD are amplified by an amplifier AMP 42, the output signals of which are A/D-converted by the A/D converter 44 into 6-bit parallel digital image signals. A dither ROM 54 is so designed as to provide weighted 6-bit codes at an interval of 8 bits both in the main scanning direction and in the sub-scanning direction, and 32 different weight codes are assigned in a matrix of $8 \times 8 = 64$ bits thus formed.

Thus, one of the different weighted codes is obtained by addressing the dither ROM 54 by a 3-bit main scanning counter 51 and a 3-bit sub-scanning counter 52. There are provided plural sets of weighted codes in the $8 \times 8$ matrix, so that the reproducibility of a halftone image can be modified by the use of different sets. The selection of the sets is made by an I/O latch (3) 53, which is preset by the CPU prior to the sub-scanning operation. The main scan counter 51 is driven by the $\phi2$ clock signals of a variable frequency depending on the image magnification ratio, and the sub-scanning counter 52 is driven by the beam detection signal. The 6-bit weighted code from the dither ROM 54 and the A/D converted 6-bit code are compared by a comparator 47 to produce digital serial image signals capable of halftone reproduction. Thus, the sampling at different clock rates means that the A/D-converted code is compared with the weighted code produced at the clock rate $\phi2$ which is different from the clock rate $\phi1$ of the A/D conversion. If the comparison is made at the same clock rate as the clock rate $\phi1$ and the image magnification or reduction is made by simply adding or eliminating the bits in accordance with a predetermined algorithm, the result will be acceptable for a usual binary digital image, but smooth reproduction is not attainable in a dither-processed halftone image, since a 45° dither pattern may be changed to a 30° or 60° pattern or a stepwise combination thereof. Accordingly, in the present embodiment, the clock rate of the comparator is rendered variable in accordance with the image magnification ratio.

In a circuit 45, the output of the A/D converter 44 is latched at $\phi1$ for synchronization because the conversion time by the A/D converter 44 varies from bit to bit. A write address counter 63 for shift memories 57-1, 57-2 is naturally driven by the clock signals $\phi2$. Thus, the shift memories 57-1, 57-2 receive 2592 bits when the image magnification ratio is unity, or 1296 bits when said ratio is ½, or 5184 bits when said ratio is two. The shift memories thus require a two-line capacity for accommodating not only 2592 bits of the CCD but also the bits added for the image magnification. As the image signals are stored in the shift memories after the magnification process and dither process, the exact data in the memories can afterwards be supplied to the laser driver of the printer in accordance with the printer speed.

The speed of the sub-scanning DC motor 37d is controlled by supplying the present content of the I/O latch (1) 58 to a VCO 59, synchronizing the oscillation frequency of the VCO 59 with a source oscillator frequency by a PLL 60, and supplying the output of the PLL 60 to a servo circuit 61. The sub-scanning stroke in the image magnification/reduction mode may be extended to the third point (431.8 mm) for any image magnification ratio, and this is convenient for the automatic area designation mode in which the image magnification ratio is continuously variable.

CCD Junction Correction

A method for automatically jointing two CCD's in the main scanning direction will now be explained.

Referring to FIG. 11, a white plate is arranged to cover the main scanning width on the home position, above the switch 37a, of the optical system so that the white plate is illuminated when the optical system is at the home position and the light source is turned on. Thus, when the optical system is at the home position, the control circuit corrects the fluctuation of the light intensity and the fluctuation of the sensitivity of two CCD's (shading correction).

A black narrow line B1 of 2 mm in width extends in the sub-scanning direction at the center of the white plate, for the purpose of junction correction. The narrow line may be of any width which is a multiple of the digitizing width. When the optical system is at the home position and the light source is turned on, said black narrow line appears on the bits near the edges of two CCD's. The resulting CCD signals are supplied to the shift memories, and the lower 128 bits of the CCD1 signals are compared with the higher 128 bits of the CCD2 signals. Said 128-bit data must have white bits in the beginning and at the end, with black bits therebetween. The number of bits equal to the sum of the number of lower white bits in the CCD1 signals and the number higher white bits and of black bits in the CCD2 signals is eliminated when the signals are read out of the CCD2 shift memory. In FIG. 11, arrows "CCD" indicate the main scanning direction, and an arrow "SUB" indicates the sub-scanning direction.

Figure 13:
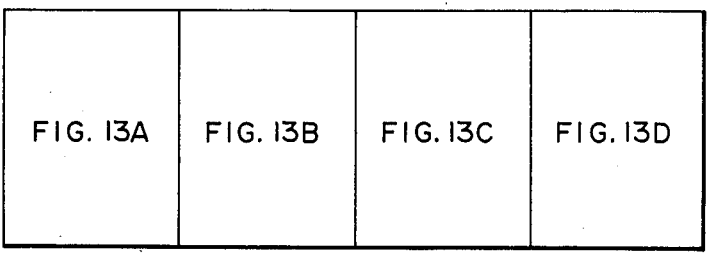
Figure 13D:
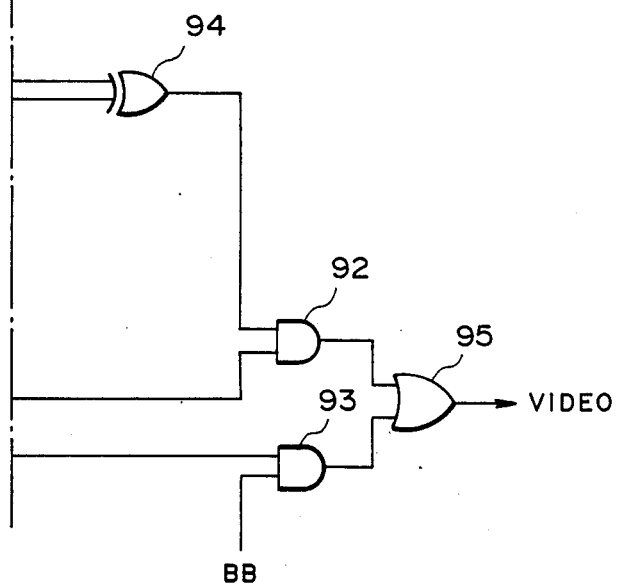
Figure 13A:
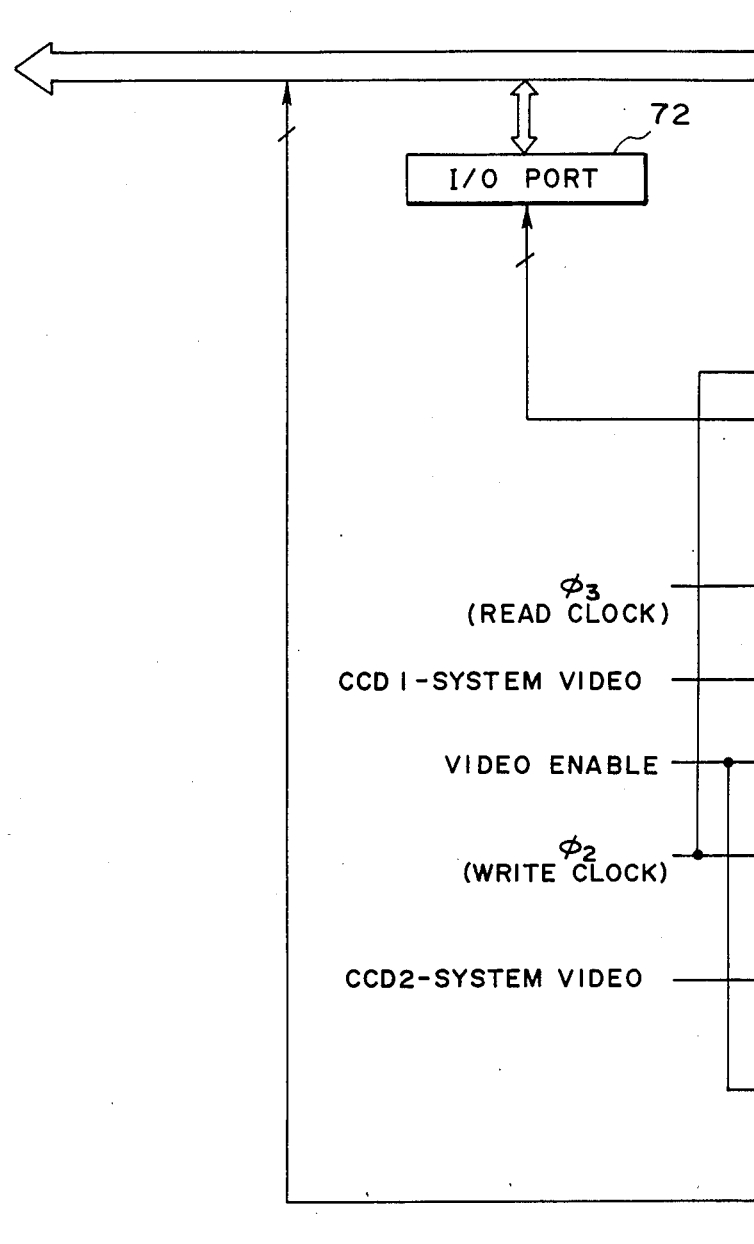
Figure 13B:
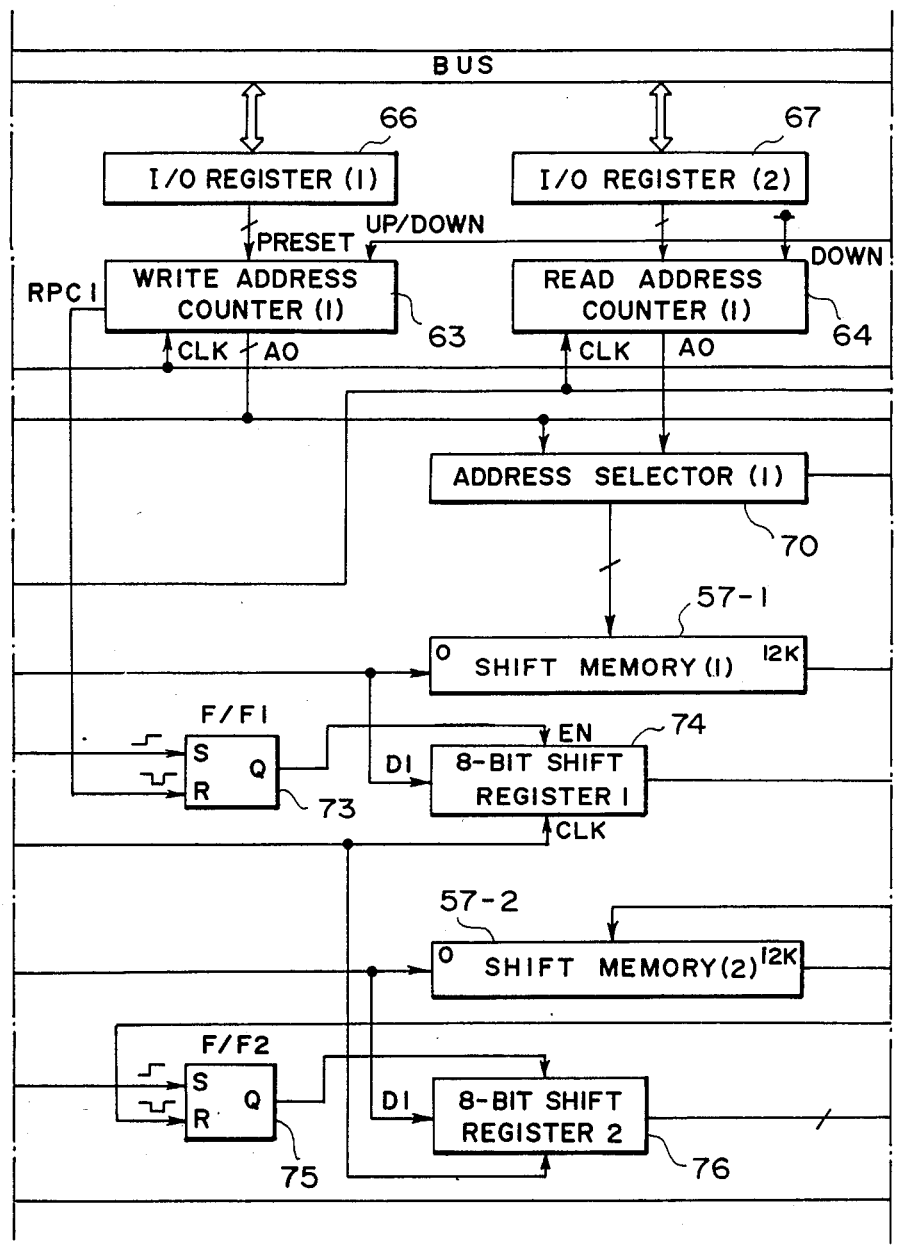
Figure 13C:
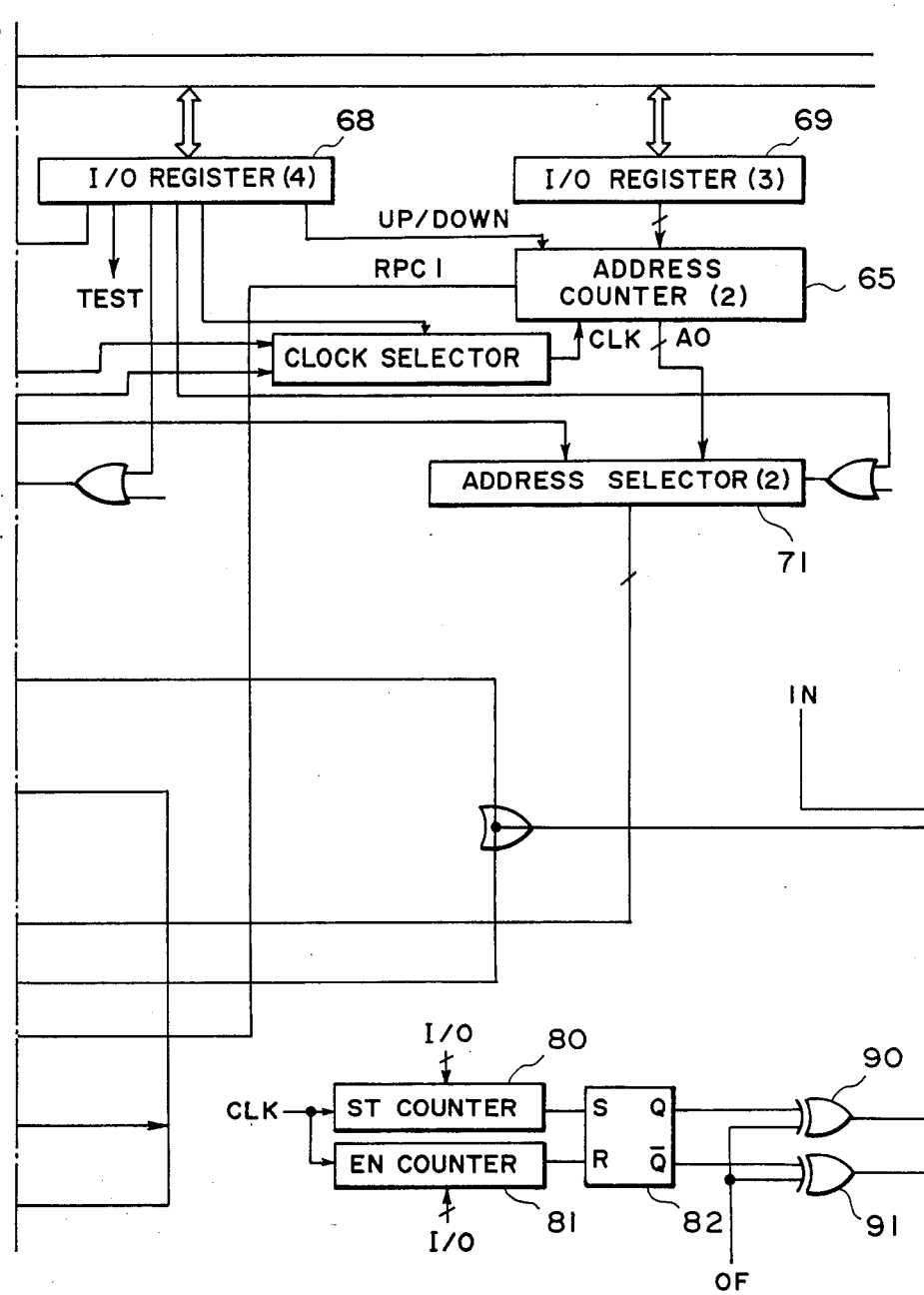

FIGS. 12 and 13 illustrate a specific method. In order to write the image signals into the shift memories 57-1, 57-2 composed of static RAM's, there are provided a write address counter 63 and read address counters 64, 65. The quantity of information supplied to the memories from the CCD's changes in accordance with the image magnification ratio. In the present embodiment, therefore, the write address counter (1) for the CCD1 counts, upwards from the least significant bit, by the input clock signals $\phi2$, the number of pixels in the CCD scanning, and the final count is stored in the RAM of the CPU. When the image magnification ratio is equal to unity, the final count should be 2592. In order to extract the lower 8 bits of the CCD1 signals (the first bit which appears in the main scanning being the most significant bit) and the higher 8 bits of the CCD2 signals, the aforementioned count is set in the write address counter 63 for the CCD1 while 08H (H indicating a hexadecimal code) is set in the address counter 65 of the CCD2, and a countdown mode is designated. 8-bit shift registers for receiving the image signals from the respective CCD's are provided. The shift registers are driven for a period starting from the rise of the VIDEO ENABLE signal, representing the main scanning period of the CCD's, to a ripple carry of the counter, which is driven by the clock signals generated during the VIDEO ENABLE period. Thus, the lower 8 bits of the CCD1 image signals remain in the CCD1 shift register and the higher 8 bits of the CCD2 image signals remain in the CCD2 shift register, after the first scanning. The contents of said shift registers are read by the CPU 36 and stored in the RAM. Then, in order to extract the lower 9th to 16th bits of the CCD1 signals and the higher 9th to 16th bits of the CCD2 signals, the aforementioned count 8 is set in the write address counter 63 for the CCD1 while 10H is set in the address counter 65 for the CCD2, and the above-mentioned operations are repeated for each of sixteen scannings to develop the higher 128 bits of the CCD1 signals and the lower 128 bits of the CCD2 signals in the memories. Then, the number of black bits, the number of lower white bits of the CCD1 signals and the number of higher white bits of the CCD2 signals are calculated. The number of junction bits (the number of bits equal to the sum of the number of lower white bits of the CCD1, the number of higher white bits of the CCD and the number of black bits of the CCD2) is eliminated when the image signals are read from the CCD2 shift memory. In this manner the jointing in the main scanning direction is attained (cf. FIGS. 12A and 12B).

The function of the shift memories after the jointing operation will now be explained. When the image signals are to be written into the shift memories, the aforementioned count is preset in the CCD1 and CCD2 write address counters 63, and the shift memories are addressed by counting down the address counter. This procedure is shown in FIG. 12C.

What is to be first considered at the image signal readout from the shift memories is the reference of the main scanning direction for the original. As shown in FIG. 11, a reference point SP for placing the original is positioned 148.5 mm off the center of the black narrow line (1.5 mm in width) for CCD jointing. Thus, the start address A1 for reading the CCD1 shift memory is given by [(the number of lower white bits)+(the number of black bits)/2+148.5×16]×image magnification ratio. The start address for reading the CCD2 shift memory is given by [(the final count)−(the number of junction bits)]×image magnification ratio. The CCD1 read address counter (1) is counted down by 4752 read clock signals $\phi_3$ of 13.89 MHz, and, when a ripple carry is produced at zero count, the CCD2 address counter (2) is counted down to read out the image signals from the shift memory. This procedure is shown in FIG. 12D. In this manner, continuous image signals (video signals) of a line are transmitted to the printer. As shown in FIGS. 12 and 13, the writing to and reading from the memory can be continuously made by writing signals of the next line in to the memories 57-3 and 57-4 while the signals are read from the memories 57-1 and 57-2, and further writing signals of the next line in the memories 57-1 and 57-2 while the signals are read from the memories 57-3 and 57-4.

FIG. 13 shows a circuit relating to the above-described shift memories, wherein are shown a static shift memory (1) for storing the CCD1 image signals; a static shift memory (2) for storing the CCD2 image signals; a write address counter 63 for writing signals into the shift memories (1) and (2); a read address counter (1) for reading signals from the shift memory (1); an address counter (2) for reading signals from the shift memory (2); an address selector (1) for selecting either the address signal from the write address counter 63 and the address signal from the read address counter (1) to address the shift memory (1); an address selector (2) for selecting either of the address signal from the write address counter 63 and the address signal of the address counter (2) to address the shift memory (2); a shift register 74 for taking out the CCD1 image signals, 8 bits at a time, starting from the least significant bit; a shift register 76 for taking out the CCD2 image signals, 8 bits at a time, starting from the most significant bit; a flip-flop 73 to be set by the rise of the video enable signal and reset by the ripple carry of the write address counter 63, and used for controlling the input period of the shift register 74; a flip-flop 75 to be set by the rise of the video enable signal and reset by the ripple carry of the read address counter (2), and used for controlling the input period of the shift register 76; and I/O port 72 for conveying the count of the write address counter 63 after it has been counted up, to the CPU; I/O counters 66–69 for supplying present counts from the CPU respectively to the write address counter 63 and the read address counters 64, 65; an I/O register 68 for designating either the count-up or countdown mode of the write address counter 63 and the address counter 65, for designating the selection of the counts of the address selectors 70 and 71, for selecting either the write or read clock signals for the address counter (2), and for supplying the CPU with a signal TEST for jointing, in response to which the CPU drives the CCD's, while the optical system is stopped, thus supplying image signals of a line to the shift memories through the CCD driver 33.

Now reference is made to the circuit diagram shown in FIG. 13, for explaining the operation of extracting the CCD1 image signals, 8 bits at a time, starting from the least significant bit and extracting the CCD2 image signals, 8 bits at a time, starting from the most significant bit, thereby extracting 128 bits for jointing the images.

[1] At first the CPU sets the write address counter 63 to the count-up mode and sets "0" in the I/O register (1).

[2] A pulse is given as the signal TEST (corresponding to the machine start) to the I/O register (4) whereby the CCD driver shown in FIG. 10 generates the signal VIDEO ENABLE and the clock signals $\phi_2$ in accordance with the image magnification ratio to supply the image signals to the shift memory.

[3] The CPU reads the content of the write address counter 63 through the I/O port.

[4] The write address counter 63 is set to the countdown mode and the address counter (2) is set to the countdown mode. The count stored in the step [3] is preset into the I/O register (1), and 7H is preset into the I/O register (3).

[5] A signal TEST pulse is generated, and when the signal VIDEO ENABLE is terminated, the 8 bits of the shift registers 74 and 76 are read in succession into the memory.

[6] The count 7H stored in the step [3] is set into the I/O register (1) and 10H is set into the I/O register (2).

[7] The step [5] is repeated.

[8] The count 77H stored in the step [3] is set into the I/O register (1) while 7FH is set into the I/O register (2), and a signal TEST is issued to read the contents of the shift registers 74, 76. The junction correction procedure is described in detail in the Japanese Patent Application No. 128073/1982 filed by the present applicant.

Image Trimming, Shifting and Magnification/Reduction

Figure 15C:
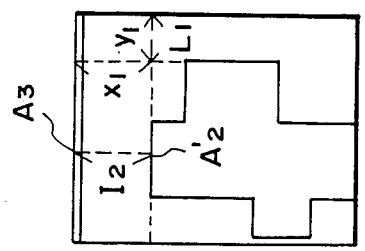
FIGS. 15A to 15F and 15H to 15M are schematic views explaining the control for image conversion.
Figure 15B:
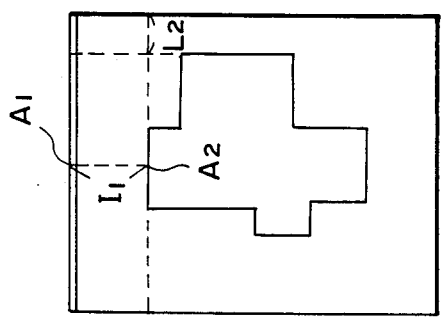
Figure 15A:
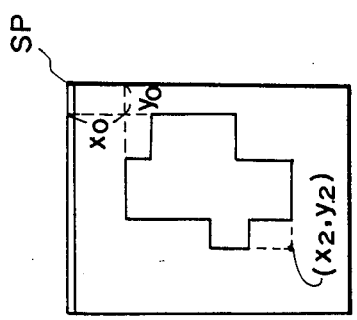
Figure 15F:
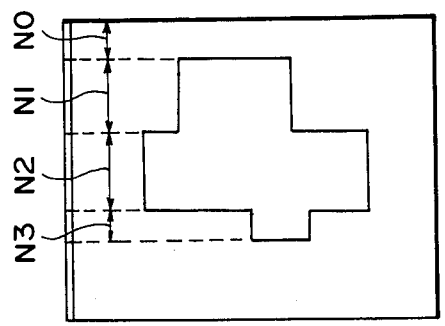
Figure 15E:
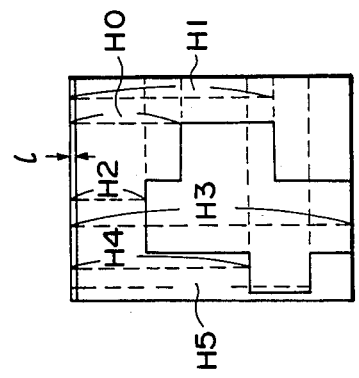
Figure 15D:
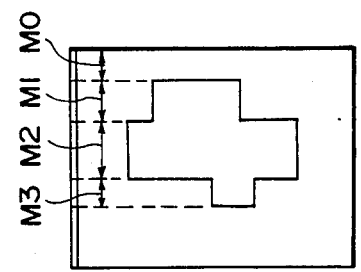

FIG. 15 illustrates an image editing method for magnifying or reducing a trimmed image at a desired scale with reference to an arbitrary point, wherein FIG. 15A shows an original image, FIG. 15B shows an enlarged image and FIG. 15C shows a shifted image. The basic procedure for image editing is to calculate coordinates after the edition based on the coordinates of a trimming area, image moving coordinates and image magnification ratio.

The procedure will be explained below. At first the CPU determines minimum coordinates $x_0$, $y_0$ (relative to the reference point SP for placing the original) of the trimming area coordinates, where x indicates coordinates in the main scanning direction and y indicates coordinates in the sub-scanning direction. The coordinates are entered by numeral keys in units of millimeters. As the resolving power is 16 lines/mm, the number of lines L0 of the $y_0$ coordinate is $y_0 \times 16$, and the amount of information I0 of the $x_0$ coordinate is $x_0 \times 16$ (FIG. 15A).

The CPU determines the minimum coordinates $x_1$, $y_1$ from the image moving coordinates after the edition (FIG. 15C).

Then a preset count of the start address for reading is determined based on $x_0$, the image magnification ratio and $x_1$ (calculation of address A3 shown in FIG. 15C). This procedure will be explained in more detail with reference to FIG. 15I. $4752 \times 2$ bits are used in shift memory for the image magnification with a magnification ratio of two. The amount of information I1 of the memory for the simple image magnification is I0 × the image magnification ratio = ($x_0$ × image magnification ratio × 16) bits. The address A2 of the shift memory corresponding to the magnification ratio of the trimming coordinate $x_0$ is (A1−I1). Said address A1 is the start address of the memory and is stored in the RAM of the CCD junction correction operation. The number of lines L2 for a magnification ratio corresponding to the coordinate $y_0$ is L0 × the magnification ratio = $y_0$ × the magnification ratio × 16. Then the start address A3 for reading the shift memory is determined as A2+I2 for shifting the magnified image to $x_1$ and releasing the image signals from that point. I2 represents the amount of information for the shift coordinate $x_1$, and is equal to $x_1 \times 16$. The number of lines L1 of the coordinate $y_1$ is $y_1 \times 16$.

Then a time interval from the generation of the signal PRINT START (paper feed roller drive signal) to the start of the optical system is determined based on $y_0$, the magnification ratio m and $y_1$ (calculation of L3 which is equal to L1−L2). When said difference is equal to +L3 (that is, when a larger space is required), the signal START is generated earlier by L3 × main scanning cycle (347.2 microseconds), than the reference T. When the difference is equal to −L3, the signal START is generated later. In this manner, the positioning of the print image in the sub-scanning direction is attained. The signal PRINT START for the first copy is generated by the start key 13a in FIG. 4, and the print start signal for the second and subsequent copies is generated by the switch 37c shown in FIG. 9. In this manner, the start timing of the optical system is controlled. This is attained by the CPU 36 which determines L3 and sends the control signal to the sequence driver 37.

The positioning of the image in the sub-scanning direction may be attained by setting a time between the switch 37b which produces the image signals and VSYNC which starts the registration roller, in accordance with L3.

Only a portion of the image signals in the main scanning direction is gated to release the image signals only to the trimming area shown in FIG. 15C. For this purpose, a start bit counter and an end bit counter are provided, respectively corresponding to the counters 80 and 81 in FIG. 13. These counters present the count data for gating through the I/O, for each trimming point. A flip-flop 82 is reset by the countup of the counter 80 and reset by the counter 81, as shown in FIG. 15G.

Figures 15H, 15I:
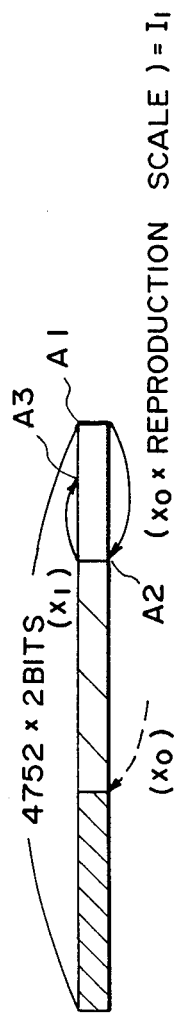

The number of bits in the main scanning direction and the number of lines between transition points in the sub-scanning direction are calculated from the coordinates of the trimming area and the image magnification ratio (FIGS. 15D to 15F), wherein M represents the number of lines between the transition points in the sub-scanning direction, H represents the number of bits in the main scanning direction in the magnification and shift mode, and N represents the number of lines between the transition points in the sub-scanning direction in the magnification mode (N=M × image magnification ratio), which are all stored in the RAM. H represents the x coordinate after edition and is given by $H = m(h-x_0) + x_1$ where h is the trimming point and m is the image magnification ratio. The CPU calculates the data to be preset in the counters 80 and 81 and stores said data in the RAM in the form of a table as shown in FIG. 15H.

After the start of the readout of the image signals from the shift memory, the CPU counts the signals VIDEO ENABLE and presets 4751 bits in the counters until the count reaches $N_0$ and gates the signals of a line. Thus, the printer does not effect printing operation during this period. After the count $N_0$, the counters are preset to gate the data only during the period between $H_0$-th bit and $H_1$-th bit, and the preset state is maintained until the count $N_1$ is reached. After the count $N_1$, and $H_2$-th and an $H_3$-th bit are preset. The above-described operations are repeated to complete the trimming.

Figure 15J:
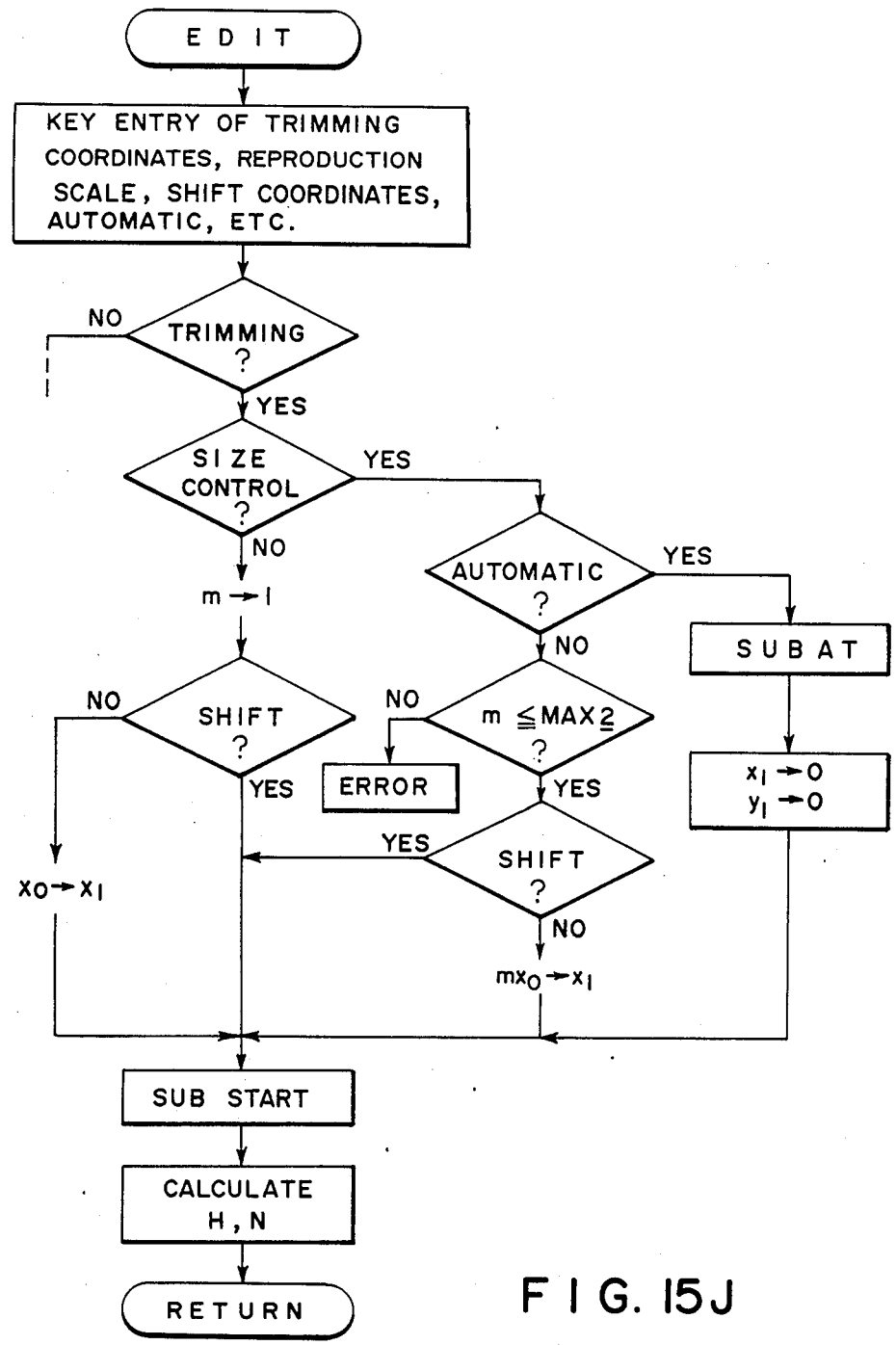
Figure 15K:
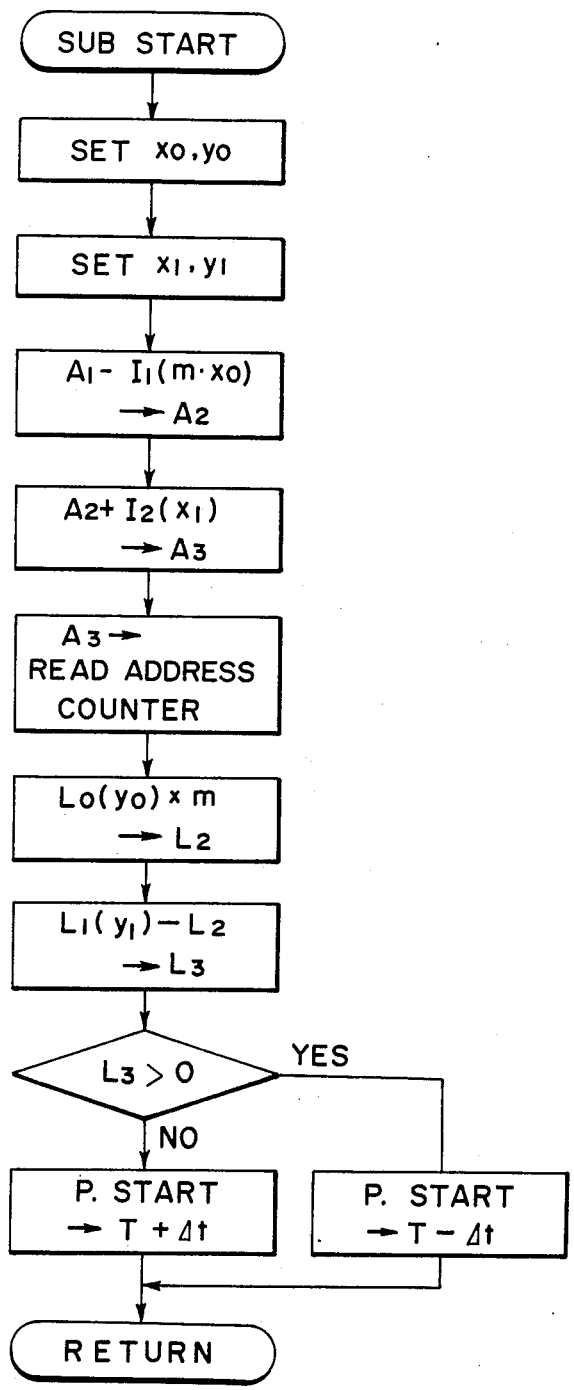

The above-described steps are shown in FIGS. 15J and 15K.

In case the image is to be released over the entire area without trimming, the start bit counter 80 and the end bit counter 81 are used to form a leading margin and a trailing margin. The initialization is same as that described above. After the count of 2 mm × 16 lines = 36 lines corresponding to the leading margin in the sub-scanning direction, the start bit counter 80 is set to 7.5 mm × 16 bits = 120 bits to suppress the printout for the length l corresponding to the width of the separating belt.

FIG. 16 shows examples of various image conversions. In FIG. 16A, steps (6) and (7) are carried out by actuating the AUTO key. By depressing the ETC key 9a in FIG. 4, "AUTO KEY" is displayed on the display 10a, and the steps (6) and (7) are carried out by actuating a program key below the display. To this end, the cassette size of the printer B is detected and the size data are sent to the reader A as the status data of FIG. 20B so that the CPU automatically selects the image magnification ratio suitable to the cassette size and controls the image magnifying operation with respect to the reference point SP. The vertical or horizontal orientation of the cassette sheet is selected by the image magnification ratio in such a manner that the entire trimmed image can be printed out.

When the ETC key 9a in FIG. 4 is actuated, "REDUCTION" is displayed on the display 10a, and a display of two series, (A3→A4, B4→B5, A4→A5) and (A3→B4, A4→B5, B4→A4), is given instead by actuating a key below the display. By actuating a key below a selected display, a fixed reduction ratio is set. By actuating the ETC key again, "MAGNIFICATION" is displayed, and a display of two series, (A4→A3, B5→B4, A5→A4) and (B4→A3, B5→A4, A4→B4), is given. A fixed magnification ratio is set by actuating a program key below a selected display. By actuating the key 9a again, "DESIGNATE MAGNIFICATION/REDUCTION RATIO" is displayed on the display 10a, and a magnification/reduction ratio is designated by the numeral keys. The magnification/reduction ratio can be selected between 2.0 at maximum and 0.5 at minimum relative to the vertical and horizontal dimensions of the original. In the case of magnification/reduction designation with trimming, an error is displayed on the display 10a if the trimmed image size after the magnification exceeds the copy sheet size.

Figure 15L:
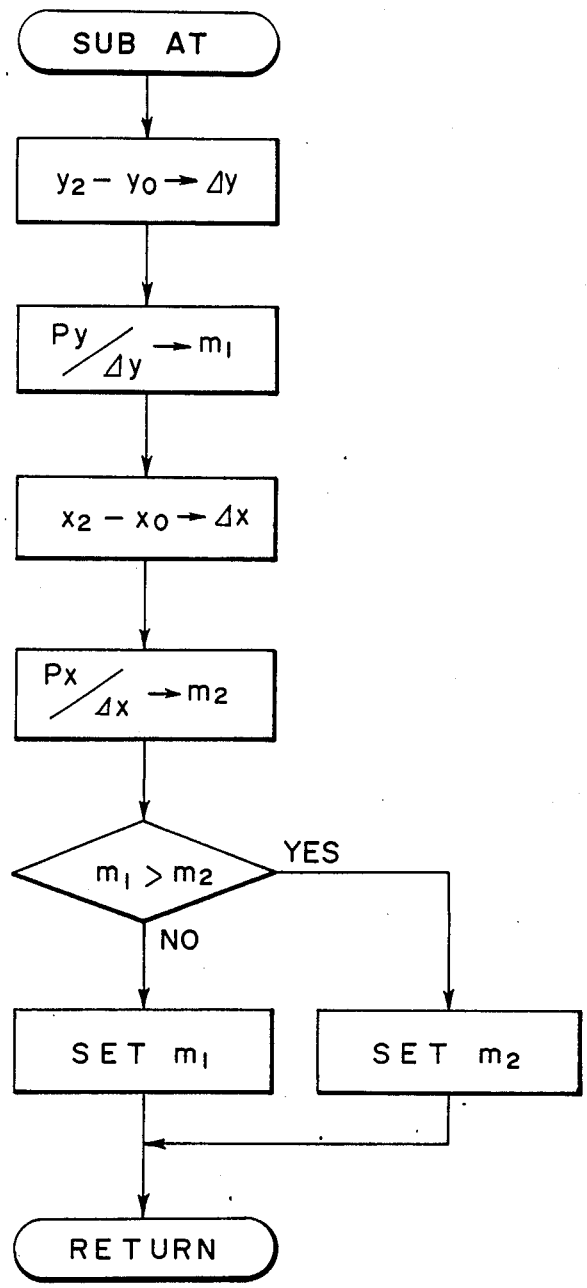

The procedure for the AUTO key is shown in FIG. 15L, in which $(x_0, y_0)$ and $(x_2, y_2)$ represent the trimming points of FIG. 15A. The trimming size is determined by $\Delta x$ and $\Delta y$, and (px, py) of the cassette size is compared with $(\Delta x, \Delta y)$ to determine the magnification ratios. $m_1$ and $m_2$, and the smaller of $m_1$ and $m_2$ is selected so that the entire trimmed image is printed out on the copy sheet. The automatic corner shifting of the trimming area alone may be carried out by presetting $m=1$, $x_1 \to 0$ by the AUTO key in FIG. 15K.

In the procedure shown in FIG. 15J, an error alarm is issued if the magnified image of the designated manual magnification ratio exceeds at least one of the cassette sizes Px and Py.

Even if the trimming is not commanded; the position of the original image on the copy sheet can be shifted to a desired position or the original image can be magnified or reduced at an arbitrary ratio.

The above-described steps are carried out with the help of the control signals from the CPU in FIG. 6 and the data latches.

Shading Correction

Figure 10A:
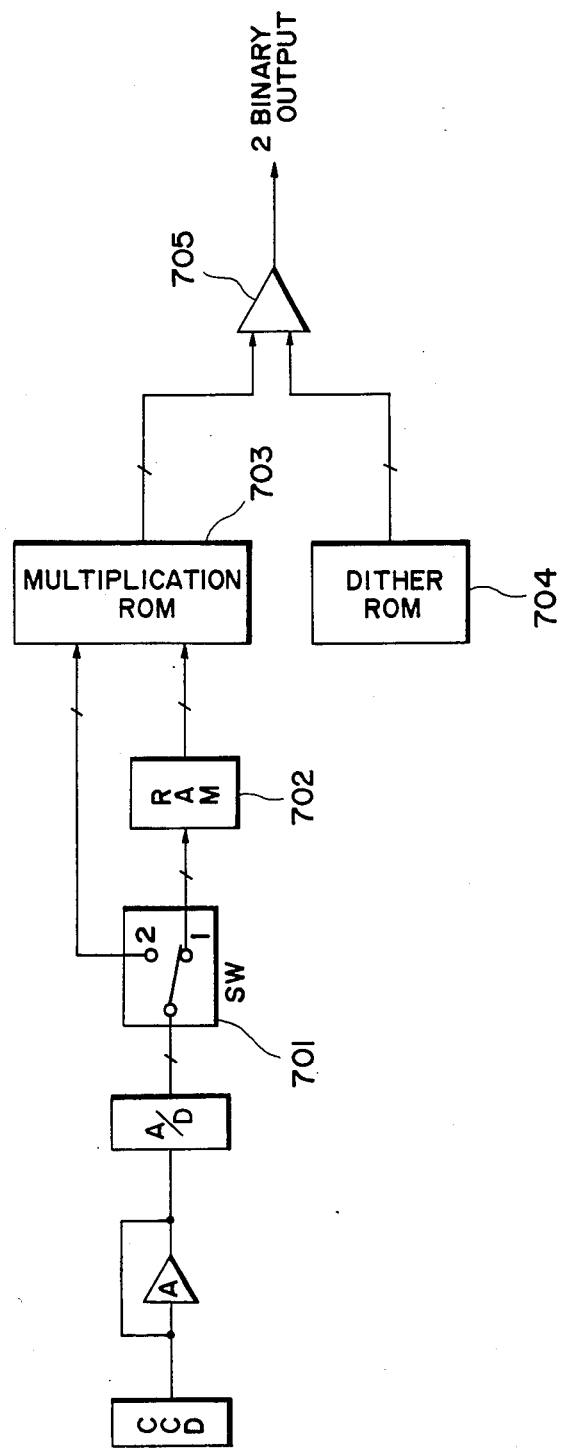

FIG. 10A shows a circuit for correcting the shading of the light source and the lens. The shading correction is carried out when the optical system is at the home position according to the following procedure. At first the fluorescent lamp is lighted to illuminate a standard white or gray plate of a width B1 provided at the home position as shown in FIG. 11, whereby the reflected light from said plate enters the CCD's. In this state the switch 701 is placed at the side 1, so that the signals from the CCD's are sampled, after amplification in the amplifier AMP and A/D conversion by the A/D converter, at every 8 bits and stored in a RAM 702. Said sampling at every 8 bits is conducted to reduce the memory capacity. Therefore the shading correction is made on sets of consecutive 8 pixels at a time, based on the shading data of a pixel contained therein.

In response to the start of original scanning, the switch 701 is shifted to the side 2 whereby the A/D-converted image signals are supplied in succession, as address signals, to a multiplying ROM 703, and at the same time the content of the RAM 702 is read at a rate of once every 8 bits of signals from the CCD and is supplied as address signals to said multiplying ROM 703. Said multiplying ROM 703 stores such data, corresponding for example to an input signal ¾ from the RAM 702, equal to the input from CCD multiplied by 4/3, whereby the ROM 703 corrects the signals from CCD in response to the input signals from the RAM 702 and supplied thus corrected signals to the comparator. The standard plate has a narrow black line for CCD junction correction at the center. Consequently, in the shading correction in this area, a shading value in a nearby area is used instead and supplied to the RAM.

The fluctuation in the light from the fluorescent lamp can be avoided on the basis of the light reflected from the standard gray plate, by controlling the lighting frequency of the fluorescent lamp in response to the result of comparison of the A/D-converted output signal with a reference value. This operation is carried out before of after said shading corection.

Selection of Binary Encoding

Figure 10B:
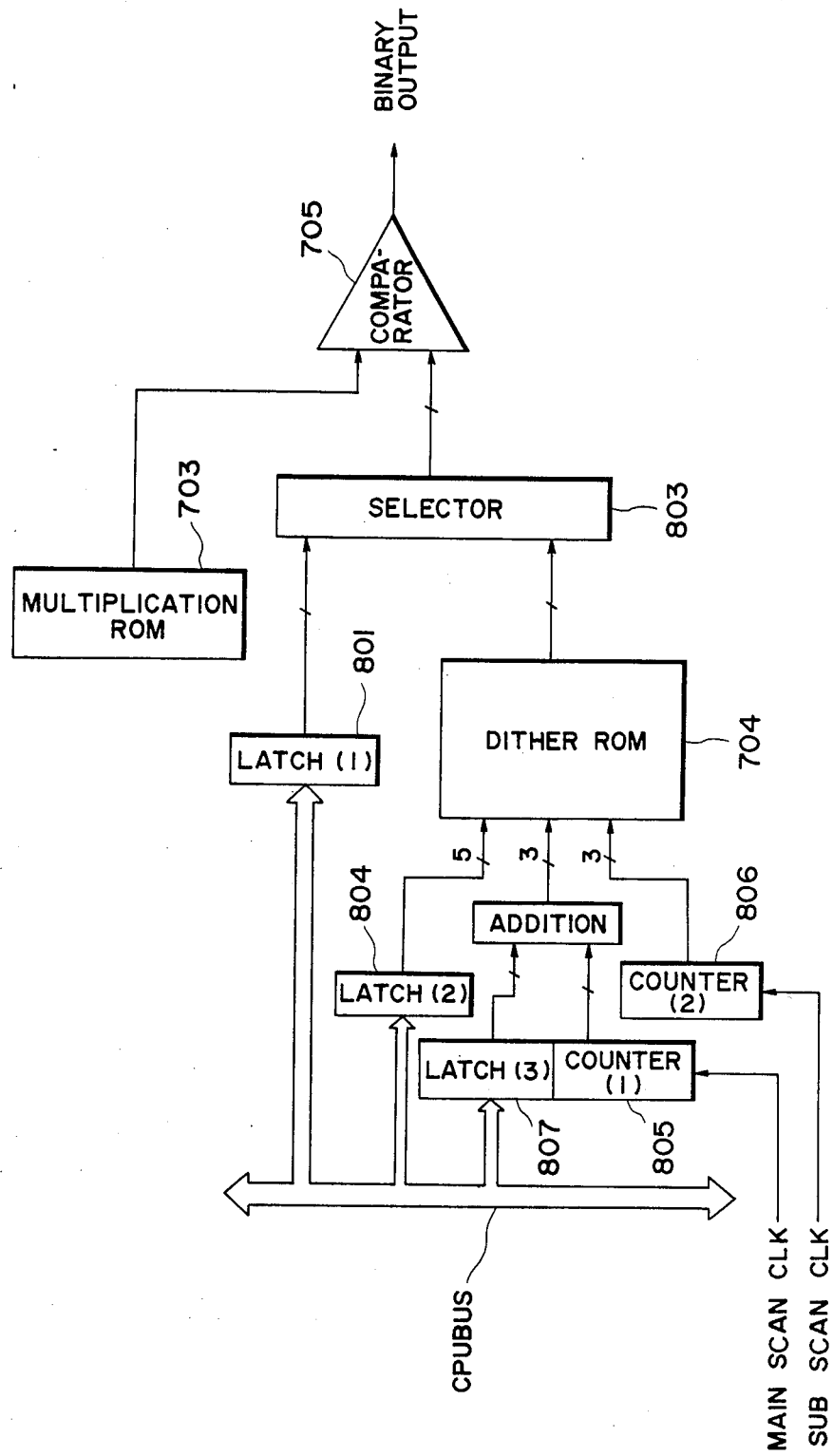
Figures 1, 10D:
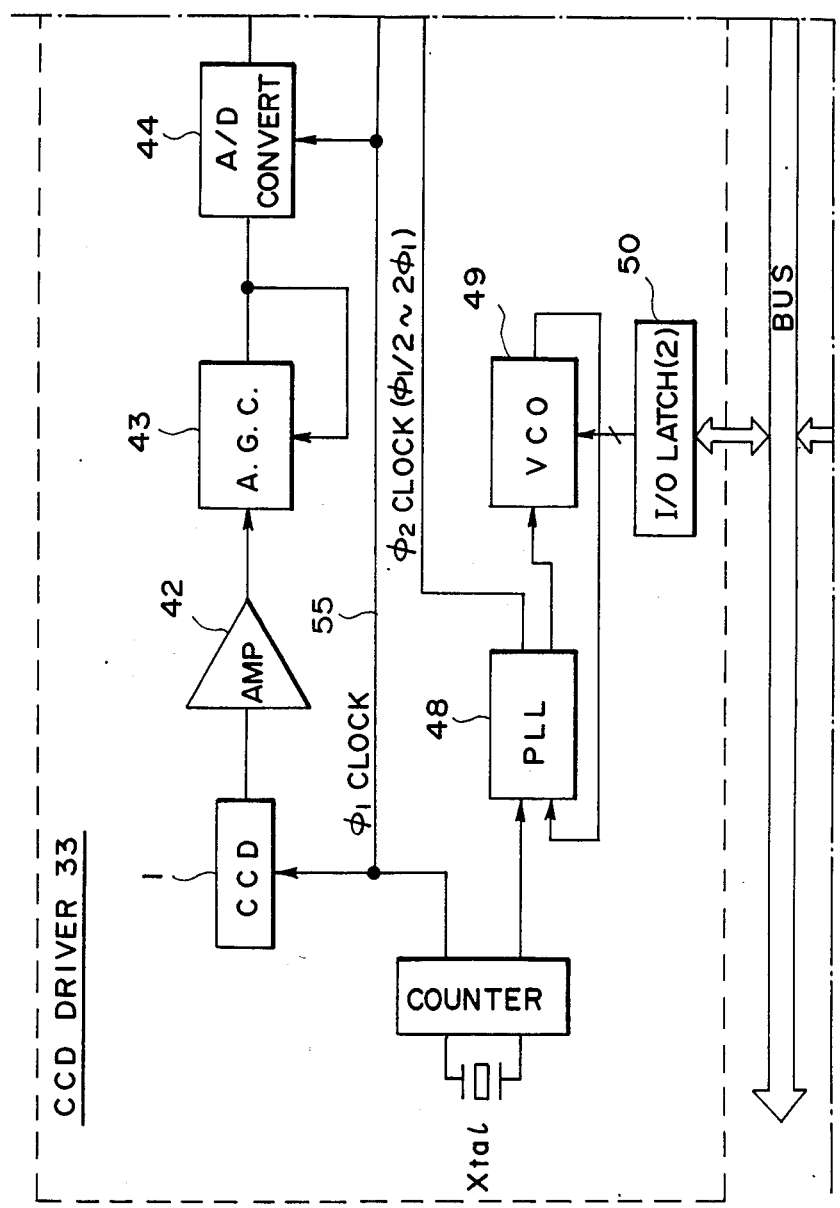
Figures 2, 10D:
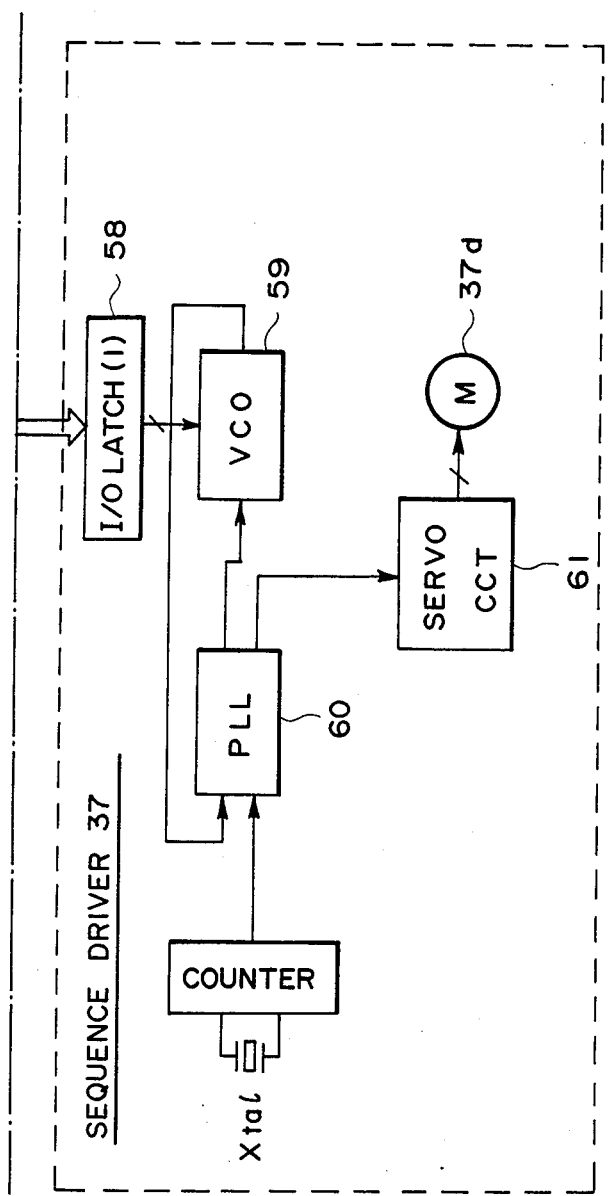
Figures 3, 10D:
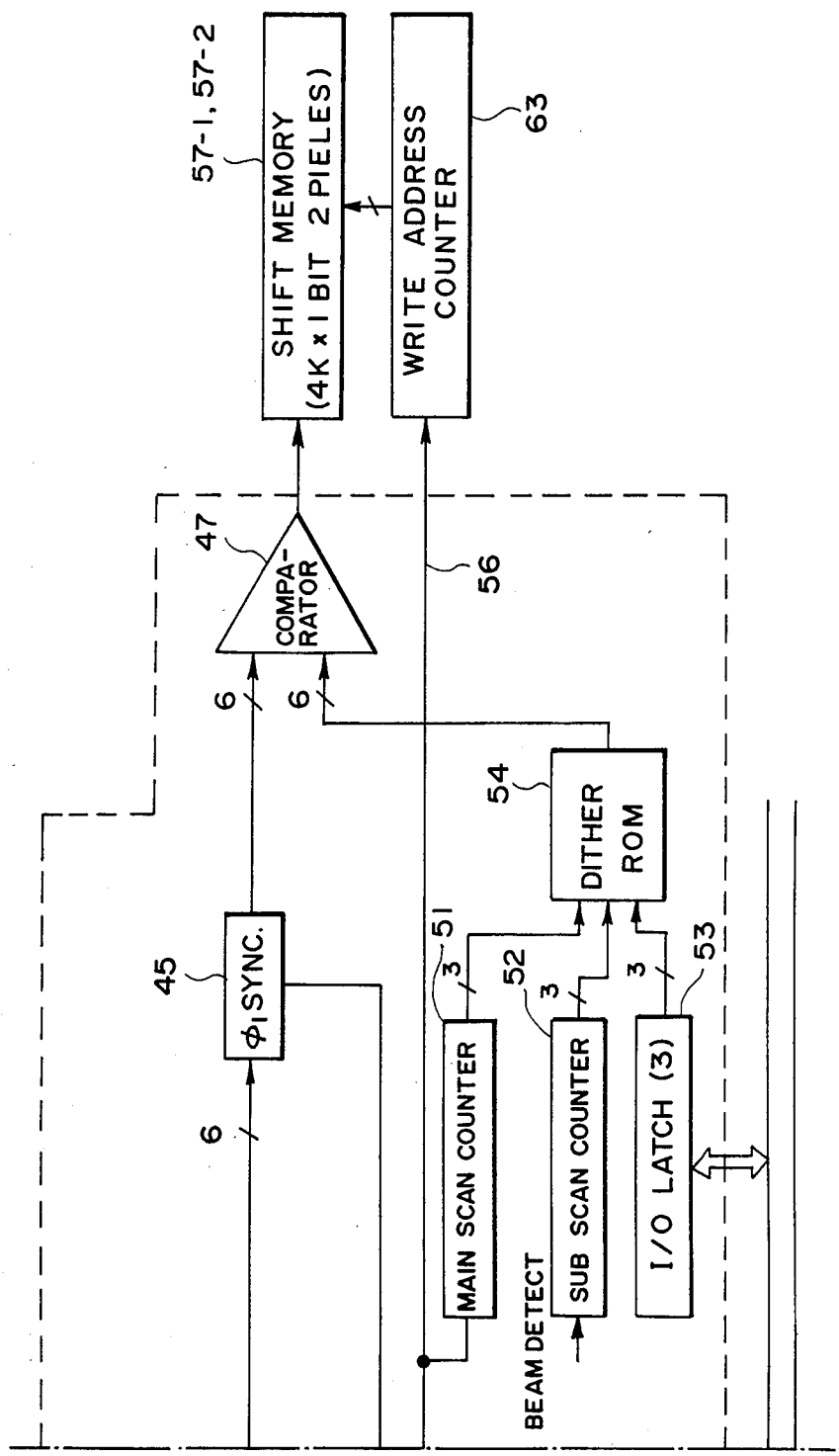

FIG. 10B shows a binary encoding circuit. In said circuit a selector 803 selects either the output signal from a latch (1) 801 or that from a dither ROM 704 in such a manner that the CPU can select the output signal from the dither ROM 704 in response to the selection of a photograph original by the operation unit or the output signal from the latch (1) 801 for a character original. When the operation unit indicates a character original, the CPU causes the selector 803 to select the latch (1) 801 and sets therein a slice level determined according to the peak hold value in the immediately preceding main scanning line or in a further preceding line (FIG. 10C) and also to the position of the density control lever 104 (FIG. 5), thereby eliminating the background density in the automatic exposure (AE) mode. Also if the operation unit indicates a photograph original, the CPU causes the selector 803 to select the dither ROM 704 and selects, in a latch (2) 804, one of dither processes 0−F, which are different in the levels and arrangements of dither elements, according to the position of the lever 104 in the operation unit.

As already explained before the CPU calculates the amount of junction of the CCD's for connecting the image signals prior to the image scanning, and the dither patterns have also to be jointed similarly. For this purpose, the CPU sets a previously calculated joint amount in a latch (3) 807, and the content of the main scanning counter (2) 806 is off-set by said amount. A counter (1) 805 is composed of a 3-bit counter driven by main scanning clock signals while the counter (2) 806 is composed of a 3-bit counter driven by sub-scanning clock signals, for example the VIDEO ENABLE signals, so that the dither pattern is composed of a matrix of 8×8 at maximum. It is also possible to use a RAM instead of the dither ROM and to fix matrix elements in said RAM by the CPU according to the selection entry 0−F.

AE Control

FIG. 10C shows a circuit for automatic exposure control. The removal of the background color of the original is achieved in the following manner. In each main scanning line the peak value is detected in the image signals from the CCD. Since the background area of an original should give the strongest reflected light when said original is illuminated, the background color can be eliminated by detecting the peak value of the CCD output signals in each main scanning line (pitch 1/16 mm) and by selecting the slicing level between said peak value and the minimum value. However, since the peak value detection can be completed only after the end of a main scanning line, the slicing level for a scanning line is determined from the peak value of the preceding scanning line after the scanning operation for said preceding scanning line is completed. Such method has proved to have an influence on the image quality.

The image signal for a first pixel obtained after shading correction in the multiplying ROM 703 shown in FIG. 10C is latched in a latch 904. After said latching, the latch signal is compared in a comparator 905 with the image signal for a second pixel, and, if the latter is larger, a port A<B releases a signal to cause said signal for the second pixel in the latch 904. Otherwise the image signal for the first pixel remains in the latch 904. This procedure is repeated until the end of the main scanning operation, whereby the peak value remains in the latch 904 at the end of the main scanning. Said peak value signal is read through an I/O port 906 at the end of each main scanning cycle, and the CPU then determines the slicing level and sets said level in the latch (1) 801 shown in FIG. 10B.

Detection of Position and Size of Original

Figure 17A:
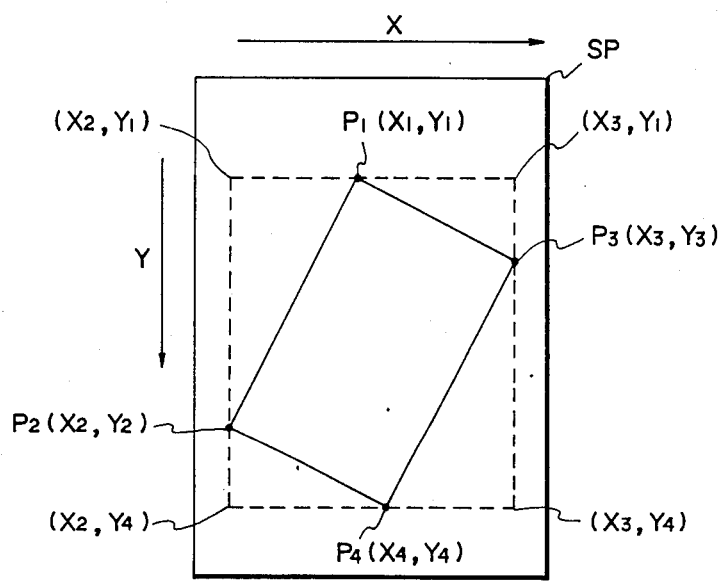
FIG. 17A is a schematic view showing the process of coordinate recognition.

FIG. 17A shows an original 300 placed on the original supporting glass 3 of the reader A. Although the original placing position is given as explained before, the original may still be placed in a diagonal orientation as illustrated. In this state, therefore a preliminary scanning operation is conducted by the optical system during the pre-rotation step of the printer to detect four sets of coordinates $(X_1, Y_1)$, $(X_2, Y_2)$, $(X_3, Y_3)$ and $(X_4, Y_4)$, wherein X and Y respectively indicate the main and subsidiary scanning directions measured from the reference point SP on the glass 302, thereby identifying the size and position of the original. These data are used for determining the scanning stroke in the multiple copying operation, selecting a suitable cassette, erasing black image outside the original and effecting automatic image magnification, reducing and/or shifting so as that the resulting image can be accommodated in the copy sheet. The original cover 4 shown in FIG. 2 is rendered reflective so that the area surrounding the original provides black data only. Said preliminary scanning is so conducted as to cover the entire area of the glass, and the scanning operation for copying is conducted thereafter. The sub-scanning speed in such preliminary scanning is larger than that in the copying cycle.

Figures 1, 17B:
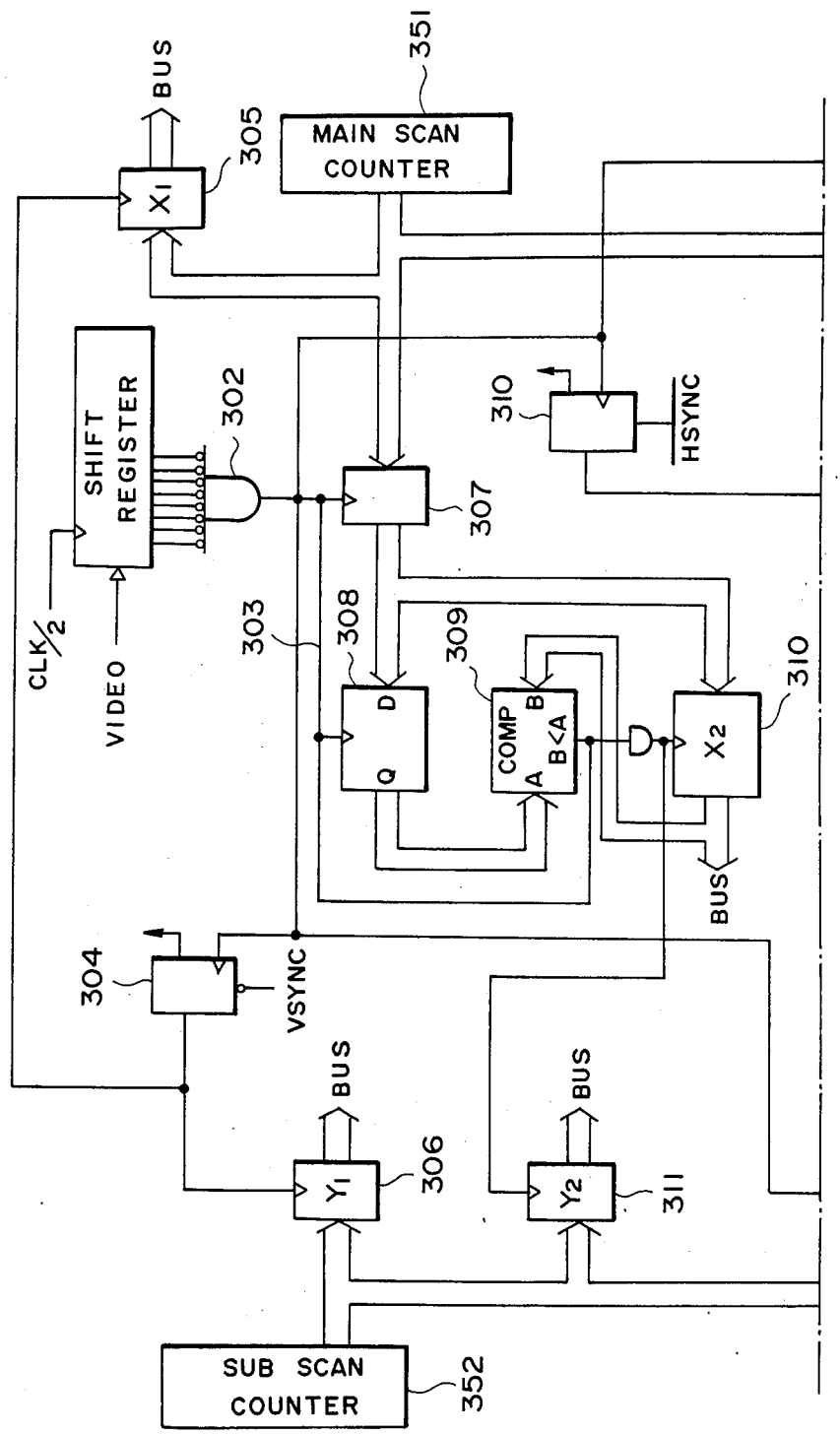
FIG. 17B, comprising

FIG. 17B shows a logic circuit for detecting the above-mentioned coordinates. The binary encoded image signals VIDEO obtained in said preliminary scanning are entered, in units or sets of 8 bits, into a shift register 301. Upon completion of said entry, a gate circuit 302 identifies whether said 8-bit data are all white, and, if so, releases a signal "1" to a signal line 303. After the start of original scanning, a flip-flop 304, which is reset in advance by the VSYNC signal, is set in response to a first signal indicating 8 white pixels, and remains in the set state until a next VSYNC signal is received. In response to the setting of said flip-flop 304, a latch 305 is loaded with the content of a main scanning counter 351, which may be the main scanning counter 51 shown in FIG. 10D or may be an exclusive counter, said content representing the $X_1$ coordinate value. Also a latch 306 is loaded with the content of a sub-scanning counter 352, which may be the sub-scanning counter 52 shown in FIG. 10D or may be an exclusive counter, thus indicating the coordinate value $Y_1$. In this manner $P_1 (X_1, Y_1)$ is determined.

The signal from the main scanning is loaded into a latch 307 every time the signal 303 assumes the level "1", and is stored in a latch 308 immediately, namely before the next 8-bit signals are entered into the shift register 301. The signal from the main scanning when the first 8-bit white signals appear is loaded in a latch 308 and compared in a comparator 309 with the signal in a latch 310, which has been changed to "0" in response to the signal VSYNC. If the signal in the latch 308 is larger, said signal, namely the signal in the latch 307 is loaded into the latch 310. At the same time the signal in the sub-scanning counter is loaded into a latch 311, before the next 8-bit signals are entered into the shift register 301. By repeating the comparison of the signals in the latches 308 and 310 over the entire image area, the latch 310 will contain the maximum value in the direction X and the latch 311 will contain a corresponding coordinate in the direction Y. In this manner the coordinate $P_2 (X_2, Y_2)$ is obtained.

A flip-flop 312 is set in response to the first 8-bit white signals in each main scanning line and maintains this state until it is reset by the horizontal synchronization signal HSYNC. The signal in the main scanning counter is set in a latch 313 at the setting of said flip-flop 312, and is loaded in a latch 314 before a next HSYNC signal. Then the signal in the latch 314 is compared in a comparator 316 with the signal in a latch 315, in which the maximum value in the direction X is preset in synchronization with the VSYNC signal. If the signal in the latch 315 is larger, a signal 317 is activated to load the signal in the latch 314, namely that in the latch 313, is loaded in the latch 315. This procedure is carried out between two consecutive HSYNC signals. By repeating the above-described comparison over the entire image area, the latch 315 will contain the minimum value $X_3$ in the direction X. Also in response to the signal 317, the value of the sub-scanning is loaded in a latch 318, representing $Y_3$.

Latches 319, 320 are loaded respectively with the values in the main scanning counter and the sub-scanning counter every time 8-bit white signals appear. Consequently, at the end off the preliminary scanning, said latches will retain the counts at the last 8-bit white signals, corresponding to $P_4 (X_4, Y_4)$.

Data lines of the above-described 8 latches 306, 311, 320, 318, 305, 310, 315, 319 are connected to the bus line BUS of the CPU shown in FIG. 6, thus supplying the corresponding data to said CPU, whereupon the CPU identifies an original area defined by $X_2$, $X_3$, $Y_1$ and $Y_4$, and utilizes these data as trimming coordinates for the aforementioned trimming, shifting, automatic image magnification etc. at the actual original scanning operation for copying. Through this procedure it is rendered possible to avoid reproduction of black image around the original, particularly observed in case of a bound original. Also the coordinates components $X_2$, $X_3$, $Y_2$ and $Y_4$ of the original allow to recognize a broken-line rectangle surrounding the original position P1–P4, thereby allowing to identifying the minimum required size of the copying sheet.

Figure 17C:
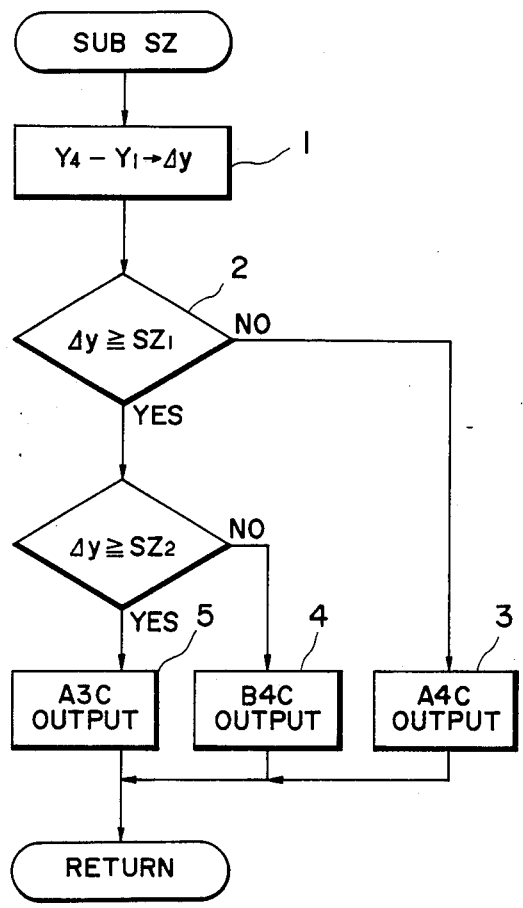
FIGS. 17C to 17F are control flow charts for coordinate recognition.
Figure 17D:
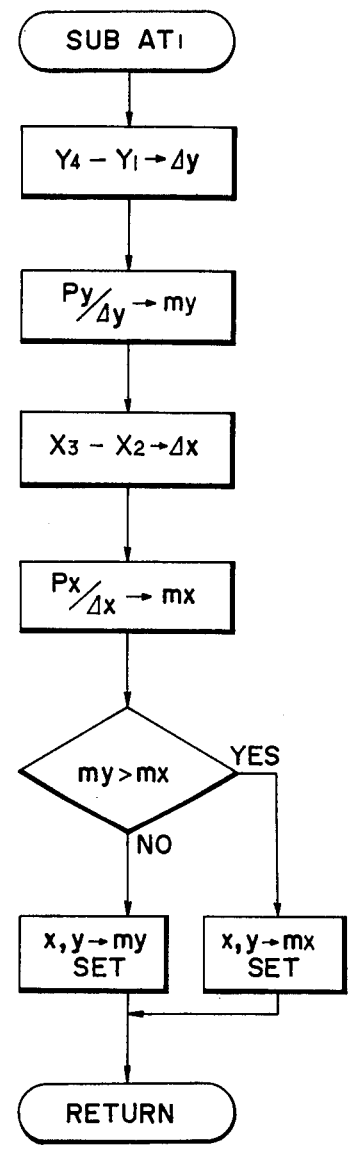

Thus, as a first example, the cassette size data from the printer are compared with the original size data for selecting a cassette closer to the original size. This procedure is carried out by a sequence control program of the CPU shown in FIG. 17C. At first a distance $\Delta Y$ between the coordinates $Y_4$ and $Y_1$ is calculated (step 1), and a comparison is made to identify whether thus calculated is smaller than A4 size (step 2). If affirmative a signal A4C is supplied to the printer for selecting the A4 cassette (step 3), and, if negative, a signal is so supplied as to select the B4 size cassette for an image smaller than B4 size or the A3 size cassette for an image larger than B4 size (steps 4, 5). The CPU of the printer compares these signals supplied through a line S. DATA with size signals already obtained from two cassettes, and carries out control in such a manner as to feed a sheet from a corresponding cassette, or, if such corresponding cassette is not present, sends the data back to the reader as an alarm, which is then displayed in the reader.

In the printer the registration roller 18 is controlled in such a manner that the leading end of a sheet is in registration with the coordinate $Y_1$. In the standard mode the registration roller 18 is activated by the signal VSYNC of the reader synchronized with the aforementioned image leading end sensor 37b, but in the automatic mode a time corresponding to $Y_1$ is provided between said signal and the signal from said sensor 37b in the same manner as in the aforementioned trimming shift mode since the image reproduction is started from the reference point SP. As each cassette is mounted at a position corresponding to the reference point SP of the reader, the image output signal is shifted by $X_1$ in the main scanning direction by suitably presetting the read address counter in the same manner as in the aforementioned trimming shift mode. The above-mentioned operation modes are selected by shift keys corresponding to the display and designated by the aforementioned ETC key, but there may be provided exclusive keys for this purpose. Furthermore the image may be reproduced at the center of a sheet by a centering process to be explained later.

As a second example, by the entry of the aforementioned AUTO1 instruction, the original area $X_2$, $X_3$, $Y_1$, $Y_4$ can be reproduced after suitable change of image size to match the sheet in the cassette. In this case the processes of trimming, shifting and image magnification change are conducted in succession in the procedures explained in relation to FIG. 16, in response to the cassette size signal supplied from the printer to the reader through the line S. DATA.

In said AUTO1 mode, same as in the AUTO1 mode for the trimming point, the ratios mx, my of the sizes $\Delta x$, $\Delta y$ of the original in the directions X, Y to the sizes Px, Py of the copy sheet in the directions X, Y are determined, and a smaller ratio is selected as a common ratio in both direction and is stored in a RAM for conducting the aforementioned image magnification/reduction process. In this manner there is obtained a copy of which size is modified with reference to a direction of the sheet. Also it is possible to obtain a copy as shown in FIG. 16A or in FIG. 9(h-2) by cornering or centering.

Figure 17E:
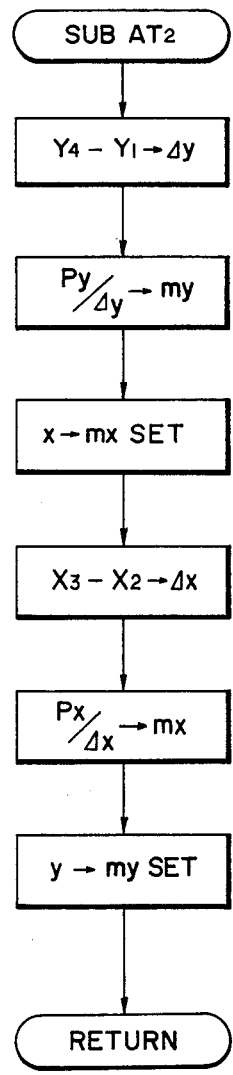

In a mode AUTO2, as shown in FIG. 17E, the ratios of the original in the directions X, Y to the sheet in same directions are determined, and are independently set. Consequently it is possible to copy an image, as shown in FIG. 19(h-1), in a full size in the sheet. In these modes AUTO1 and AUTO2, if the sheet still has a marginal space even at the maximum image magnification ratio of 2, the image reproduction may be automatically accompanied by centering or cornering. The output form in said AUTO1 and AUTO2 modes is same as in the automatic image magnification/reduction mode in which the trimming coordinates are designated by numeral keys.

Figure 17F:
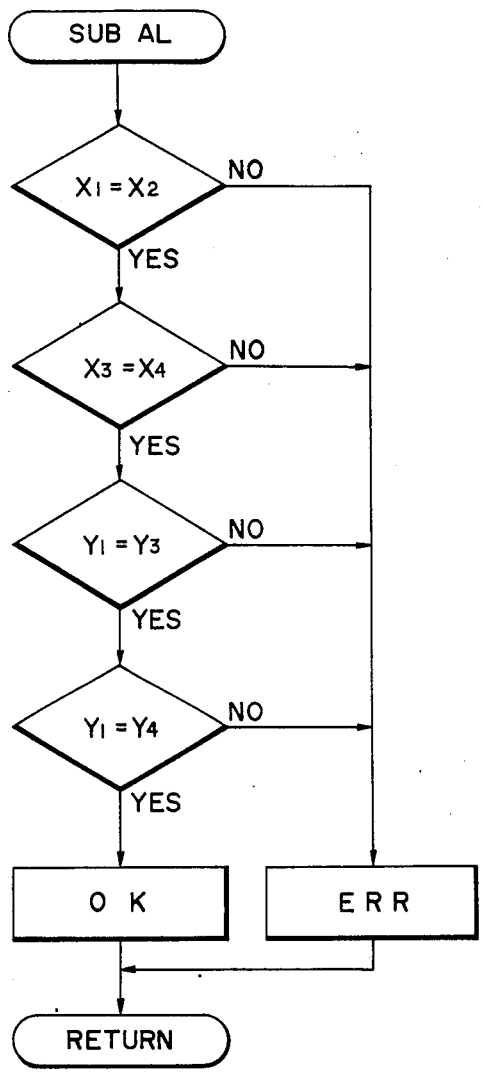

As a third example, there may be obtained an alarm for an inclined orientation of the original. In this case comparisons are made in each set of $X_1$-$X_2$, $X_3$-$X_4$, $Y_1$-$Y_2$ and $Y_3$-$Y_4$ of the point P1-P4 in FIG. 17F to identify whether the coordinates in each set are mutually substantially same (within a tolerance of several bits), and, if not, an alarm is given, though the copying operation is still enabled. The above-mentioned flow is conducted by a program executed by the CPU.

Figure 15M:
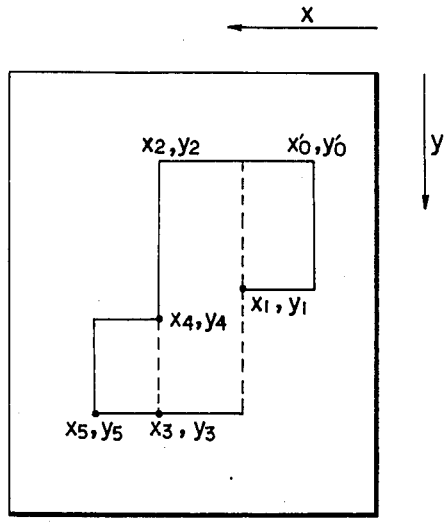

FIG. 15J shows a flow chart showing the procedures of the aforementioned trimming, image magnification/reduction and shifting. A processing on a point $(X_0, Y_0)$ is at first conducted in case the procedure involves image shifting as shown in FIG. 15K, but, in the absence of image shifting operation, the start bit counter and the end bit counter shown in FIG. 13 are controlled in an order of $x_0'$, $y_0' \rightarrow x_5$, $y_5$ as shown in FIG. 15M to obtain a totally white area around the trimming area. In this case the trimmable area is a single area surrounded by linear lines, and said area is divided in the y-direction into rectangles each of which is defined by two points on the diagonal. Three rectangles are permitted at maximum by said division, and the size is entered in the unit of millimeter.

Thus there is conducted a procedure represented by:

$$(x_0y_0, x_1y_1) + (x_2y_2, x_3y_3) + (x_4y_4, x_5y_5).$$

The image output signals VIDEO are controlled by the coordinate conversion in the same manner as explained before, also in the modes MANUAL SHIFT and AUTO.

Also in case of various shifting (arbitrary, cornering, centering) and various image magnification/reduction (arbitrary, fixed form, automatic), the trimming image or the area around the original image may be rendered white or black according to the final coordinates.

(Switching of threshold data):

In the following there will be given an explanation of the method of setting the threshold value for binary encoding.

The threshold value for binary encoding into black and white is set at a level providing the largest noise margin. In the case that the $\gamma$-characteristic (output-to-density ratio) is linear ($\gamma = 1$), a level at the middle between white and black levels, for example a level 32 between the level "0" for white and the level "63" for black, is taken as the threshold value for binary encoding. This value is adopted always for the aforementioned junction correction, independent of other sequences such as the original recognition or the signal processing for image reproduction. At the start of a copying operation in response to the actuation of the copy start key, there is at first conducted the aforementioned junction correcting process, then the original is scanned to achieve automatic original recognition, and the original is thereafter scanned for conducting the output signal processing for the image reproduction. The error in signal splicing resulting from the mechanical shock in the optical system can be alleviated if said junction correction is conducted upon each return of the optical system to the home position after original image scanning. The recognition of the original image is conducted each time the original document is exchanged, but is not conducted when the copying operation is repeated for a same original.

In the aforementioned original recognition, it is to be noted that the originals may have different background colors. Thus, if the threshold level is so determined between black and white levels as not to reproduce the background color, an original with a dark background, for example a dark blueprint, may not be recognized as it is hardly distinguishable from the original cover.

In order to ensure recognition of such original, the threshold value, in case of $\gamma = 1$, is preferably is selected at a level closer to the black level than the middle between the black (63) and white (0) levels, for example at a level 40.

On the other hand, if such dark originals are hardly expected but the original cover is easily smeared, the threshold value should preferably be set closer to the white level, for example at a level 20, in order to prevent erroneous detection by such smear.

The level selection for such junction correction and original recognition can be made by a service man for example with an unrepresented switch provided in the recasing. The process of the original recognition is conducted by the above-mentioned level independently from other sequences or operating modes.

Figure 18A:
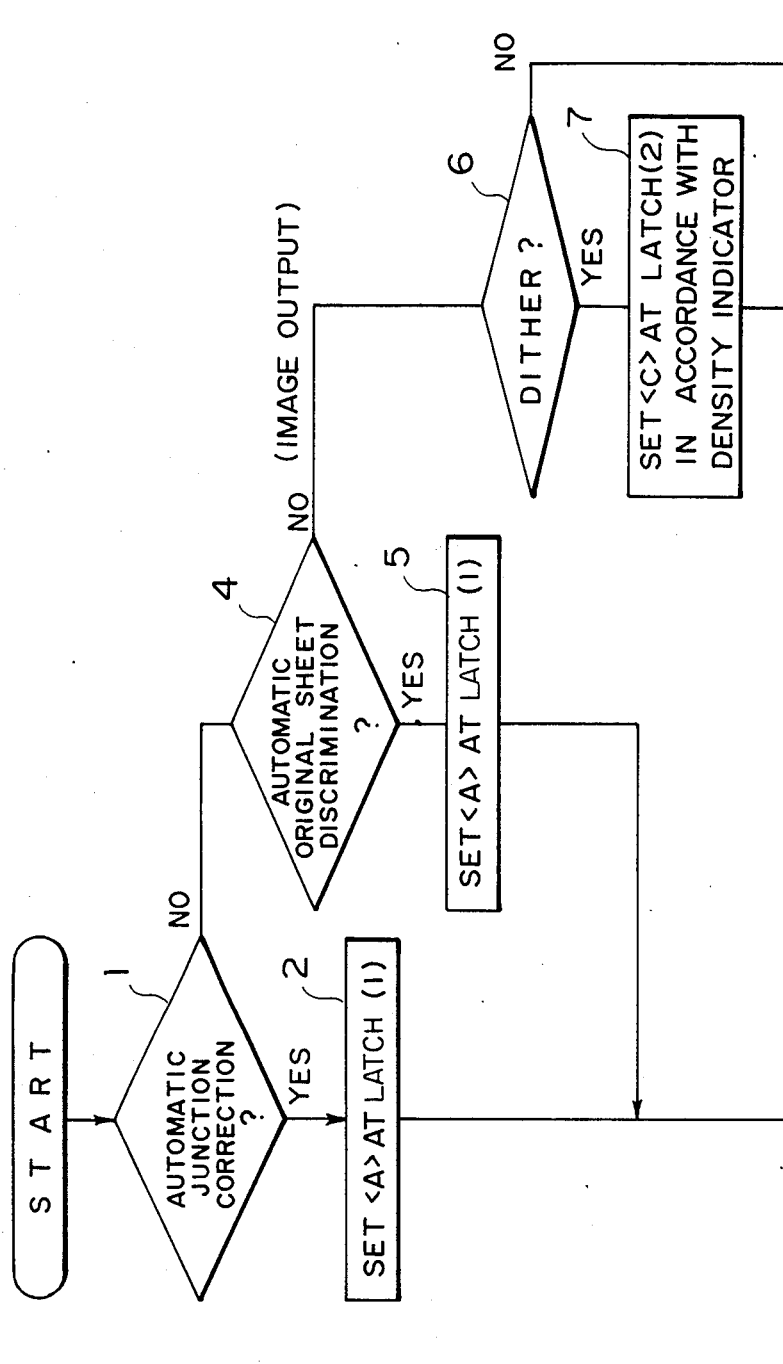

The above-mentioned threshold level switching is achieved by automatic data setting through data processing according to a flow shown in FIG. 18 in the latches (1) and (2) shown in FIG. 10B. Now reference is made to FIG. 18.

Upon identification of the completion of the preceding steps of shading correction, etc., explained before (step 1), the automatic junction correction sequence is started to set the data A of the aforementioned first level in the latch (1) 801 (step 2), regardless of the set position of the density indicator 104.

Then the selector 803 is caused to select the latch (1) (step 3) whereby the data obtained by reading the marker are binary encoded by the data stored in the latch (1).

The sequence for automatic recognition of the position and dimension of the original image is initiated when the document scanning is started by the displacement of the optical system after the completion of the junction correction. Said sequence is only conducted when required, and the program will immediately proceed to the image output sequence if it is not required. For this purpose, a step 4 identifies whether the automatic recognition sequence has been selected by the key 201, and, if it has been selected, data B of the aforementioned second level are set in the latch (1) 801 regardless of the set position of the density indicator 104 (step 5). Then the selector 803 is caused to select the latch (1) thereby effecting the automatic recognition process.

When the optical system returns to the home position after the automatic recognition sequence, the program proceeds to the image output sequence after repeating the automatic junction correction sequence (steps 1 to 3).

Upon entry into the image output sequence, there is at first identified whether a dither mode for halftone reproduction has been selected by the key 113 for selecting the reproduction mode shown in FIG. 5. The dither process is not selected in the character mode.

When the dither mode is selected, data C are set in the latch (2) according to the setting of the density indicator 104 to reproduce the image of the corresponding density (step 7), and one of the threshold level patterns stored in the dither ROM 704 is selected. Then the selector 1 is shifted to the latch (2) (step 8) whereby the pattern data of the dither ROM stored in the latch (2) are released to effect the dither processing.

On the other hand, in case a simple black-and-white reproduction is selected instead of the dither mode, data D are set in the latch (1) 801 according to the setting of the density indicator 104 (step 9). Then the selector 1 is shifted to the latch (1) to effect the binary encoding.

The data latched in the step 7 or 9 are retained at least during the continuation of repeated printing operations, and are replaced by standard data after the lapse of a determined time from the completion of said printing operation.

In such case, after the lapse of said determined time, the data of the latch (1) are replaced by the aforementioned data, while those of the latch (2) are reset to data for selecting a dither pattern for reproducing the standard density. Otherwise the selector 1 may be automatically shifted from the latch (2) to the latch (1) at a determined time after the completion of the printing operation, whereby the data for the dither pattern are replaced by the fixed threshold level A to preferentially select the character reproducing mode.

In case the original recognition is conducted thereafter, the data B are set in the latch (1) during the recognition process as explained before. Then, upon completion of the recognition process, the program proceeds to the image reproduction process in which the image is reproduced by the data A stored in the latch (1) unless the density indicator 104 is manipulated anew. In this case, if the density indicator 104 comprises key entry means and corresponding display means, the display is switched to the intermediate density (e.g., setting 5) in response to the setting of the data A into the latch (1).

The data latched in the step 4 or 5 may be changed by shifting the lever or actuating the key of the density indicator 104 during the course of repeated printing operations. The latched data A, B are not affected by the manipulation of the density indicator 104. The data C in the step 7 may be modified by the mode key 113 to select dither patterns suitable for the reproduction of sectioned image, photographic image etc.

In the following there will be described another binary encoding circuit. It is possible to store, in a ROM, reproduction data obtained by a dither process or by a process with a fixed threshold value and to release said reproduction data for each pixel in response to the image data from the ROM 703. Also in this case, the process of junction correction or image recognition employs a binary encoding different from that in the image reproduction process. Also in case the halftone data of each pixel are reproduced with data of a group of dots, the data processing in the junction correction and image recognition is conducted in a different condition than that for the image production. Also in the case that the circuit for binary encoding for generating data for image reproduction is different from the circuit for binary encoding for junction correction or image recognition, a high image quality can be obtained by setting the threshold level in the latter circuit differently from that in the former circuit.

What is claimed is:

1. An image processing system comprising:
   means for reading an image which comprises at least one page;
   means for processing image data from said reading means to generate a video signal; and
   means for identifying at least one of a dimension and a position of the image to generate an image state signal in accordance with the identified dimension or position, respectively;
   wherein said process mean processes the image data on the basis of the image state signal generated by said identifying means, and mutually different data processes are executed respectively in accordance with a first parameter in identification by said identifying means and a second parameter in image data processing by said process means, said first and second parameters being different from each other, and said mutually different data processes being executed during the reading of one page of the image by said reading means, and wherein said identifying means identifies the image state in accordance with image data read by pre-scan of the image prior to scan of the image by said process means.

2. An image processing system according to claim 1, wherein one of said mutually different data processes is executed by employing different threshold levels.

3. An image processing apparatus according to claim 1, wherein said identifying means binary-encodes the image data by a predetermined threshold signal.

4. An image processing apparatus according to claim 1, wherein said process means processes the image data using a periodically changing threshold signal to generate a half-tone video signal.

5. An image processing apparatus according to claim 1, wherein said process means processes the image data using a dither pattern parameter.

6. An image processing apparatus according to claim 1, wherein said process means processes the image data in accordance with the image state identified by said identifying means so as to convert image data other than image data from an original document, into data of a predetermined level and output the converted data.

7. An image processing system comprising:
means for reading an image, said reading means including a plurality of sensors; and
means for processing image data from said reading means to generate a video signal and for correcting data from said plurality of sensors to generate the image data, said processing/correcting means comprising an encoding circuit for use in said processing and in said correcting;
wherein first and second mutually different encoding processes are executed respectively in data correcting and in image data processing by said processing/correcting means, and mutually different threshold parameters are set in synchronism with changeover between the image processing and the data correcting so that each of said encoding processes may be executed in said encoding circuit.

8. An image processing apparatus comprising:
first process means for processing image data to generate a video signal; and
second process means for processing the image data to identify an image state in accordance with the image data;
said first and second process means processing the image data in accordance with respective threshold signals different from each other,
said first process means processing the image data in accordance with the image state identified by said second process means, and
said second process means identifying coordinates of an image corresponding to the image data.

9. An image processing apparatus according to claim 8, wherein said first process means processes the image data in accordance with an image area identified by said second process means so as to convert image data other than image data corresponding to the image area, into data of a predetermined level and output the converted data.

10. An image processing system comprising:
image reading means comprising plural sensors to generate image data;
first process means for processing the image data from said reading means to generate a video signal; and
second process means for correcting the data supplied from said plural sensors to generate image data having no overlapping portions;
said first and second process means processing the data from said reading means in accordance with respective threshold signals different from each other.

11. An image processing apparatus comprising:
first process means for processing image data to generate a video signal; and
second process means for processing the image data to identify an image state in accordance with the image data;
said first and second process means processing the image data in accordance with respective threshold signals different from each other, and
said first process means processing the image data in accordance with the imag state identified by said second process means, wherein the image state which said second process means identifies is image position.

12. An image processing apparatus comprising:
first process means for processing image data to generate a video signal; and
second process means for processing the image data to identify an image state in accordance with the image data;
said first and second process means processing the image data in accordance with respective threshold signals different from each other, and
said first process means processing the image data in accordance with the image state identified by said second process means, wherein said second process means identifies the image state in accordance with the image data read by pre-scan of an original image prior to scan of the original image by said first process means.

13. An image processing apparatus according to claim 8, 10, 11 or 12, wherein said second process means binary-encodes the image data by a predetermined threshold signal.

14. An image processing apparatus according to claim 8, 10, 11 or 12, wherein said first process means processes the image data using a periodically changing threshold signal to generate a half-tone video signal.

15. An image processing apparatus according to claim 8, 10, 11 or 12, wherein said first process means processes the image data using a dither pattern parameter.

16. An image processing apparatus acccording to claim 8, 11 or 12, wherein said first process means processes an image data in accordance with the image position identified by said second process means, to cause an apparatus in which an image is to be reproduced on the basis of the video signals to reproduce the image at a predetermined image position.

17. An apparatus according to claim 8 or 11, further comprising means for optically reading an original image, wherein said first process means processes the image data to reproduce an image during the reading of the original image by said reading means.

18. An apparatus according to claim 8 or 11, wherein said second process means identifies the image state in accordance with the image data read by pre-scan of an original image prior to scan of the original image by said first process means.

19. An apparatus according to claim 11 or 12, wherein said second process means identifies coordinates of an image corresponding to the image data.

20. An apparatus according to claim 18, wherein said second process means identifies the image state during the pre-scan.

21. An apparatus according to claim 20, further comprising means for optically reading an original image, wherein said first process means processes the image data to reproduce an image during the reading of the original image by said reading means.

22. An apparatus according to claim 12, wherein said second process means identifies the image state during the pre-scan.

23. An apparatus according to claim 22, further comprising means for optically reading an original image, wherein said first process means processes the image data to reproduce an image during the reading of the original image by said reading means.

* * * * *

UNITED STATES PATENT AND TRADEMARK OFFICE
CERTIFICATE OF CORRECTION

PATENT NO. : 4,701,805            Page 1 of 4

DATED : October 20, 1987

INVENTOR(S) : KATSUYOSHI MAESHIMA

It is certified that error appears in the above-identified patent and that said Letters Patent is hereby corrected as shown below:

AT [56] IN THE REFERENCES

U.S. Patents, "Janway, III" should read --Janeway, III--.
    U.S. Patents, "Kurokami et al." should read --Kurakami et al.--.

COLUMN 1

Line 37, "specifically" should read --specifically,--.

COLUMN 2

Line 11, "a" should read --or a--.

COLUMN 3

Line 15, "separate" should read --separate from--.
    Line 59, "collimeter" should read --collimator--.
    Line 64, "collimeter" should read --collimator--.

COLUMN 4

Line 18, "trophotograhic" should read --trophotographic--.
    Line 37, "in" should read --at--.
    Line 45, "function" should read --functions--.
    Line 51, "with" should read --which--.

COLUMN 8

Line 13, "of" should read --for--.
    Line 25, "keys key," should read --keys,--.
    Line 57, "connectorJR1" should read --connector JR1--.

UNITED STATES PATENT AND TRADEMARK OFFICE
CERTIFICATE OF CORRECTION

PATENT NO. : 4,701,805
DATED : October 20, 1987
INVENTOR(S) : KATSUYOSHI MAESHIMA It is certified that error appears in the above-identified patent and that said Letters Patent is hereby corrected as shown below:

COLUMN 9

Line 12, "half tone" should read --halftone--.

COLUMN 10

Line 63, "of" (first occurrence) should be deleted.

COLUMN 12

Line 63, "set" should read --sets--.

COLUMN 13

Line 61, "present" should read --preset--.

COLUMN 14

Line 30, "higher" should read --of higher--.

COLUMN 15

Line 45, "in to" should read --into--.
    Line 47, "in" should read --into--.

COLUMN 16

Line 7, "and" should read --an--.
    Line 10, "present" should read --preset--.
    Line 53, "77H" should read --7H--.

UNITED STATES PATENT AND TRADEMARK OFFICE
CERTIFICATE OF CORRECTION

PATENT NO. : 4,701,805
DATED : October 20, 1987
INVENTOR(S) : KATSUYOSHI MAESHIMA It is certified that error appears in the above-identified patent and that said Letters Patent is hereby corrected as shown below:

COLUMN 17

Line 21, "shift" should read --the shift--.
Line 22, "the" should be deleted.
Line 68, "present" should read --preset--.

COLUMN 18

Line 32, "and $H_2$-th" should read --an $H_2$-th--.

COLUMN 19

Line 29, "commanded;" should read --commanded,--.
Line 66, "supplied" should read --supplies--.

COLUMN 20

Line 9, "of" should read --or--.

COLUMN 22

Line 34, "off" should read --of--.
Line 48, "coordinates" should read --coordinate--.
Line 51, "identifying" should read --identify--.

COLUMN 23

Line 40, "direction" should read --directions--.
Line 45, "FIG. 9(h-2)" should read --FIG. 16B--.
Line 51, "FIG. 19(h-1)" should read --FIG. 16B--.

UNITED STATES PATENT AND TRADEMARK OFFICE
CERTIFICATE OF CORRECTION

PATENT NO. : 4,701,805
DATED : October 20, 1987
INVENTOR(S) : KATSUYOSHI MAESHIMA It is certified that error appears in the above-identified patent and that said Letters Patent is hereby corrected as shown below:

COLUMN 24

Line 67, "is" (second occurrence) should be deleted.

COLUMN 27

Line 41, "image processing" should read --image data processing--.

COLUMN 28

Line 20, "imag" should read --image--.

Signed and Sealed this

Twenty-sixth Day of July, 1988

Attest:

DONALD J. QUIGG

*Attesting Officer*    *Commissioner of Patents and Trademarks*